United States Patent
Ylonen

(10) Patent No.: US 10,003,458 B2
(45) Date of Patent: Jun. 19, 2018

(54) USER KEY MANAGEMENT FOR THE SECURE SHELL (SSH)

(71) Applicant: Tatu J. Ylonen, Espoo (FI)

(72) Inventor: Tatu J. Ylonen, Espoo (FI)

(73) Assignee: SSH COMMUNICATIONS SECURITY CORP., Helsinki (FI)

( * ) Notice: Subject to any disclaimer, the term of this patent is extended or adjusted under 35 U.S.C. 154(b) by 0 days. days.

(21) Appl. No.: 13/723,204

(22) Filed: Dec. 21, 2012

(65) Prior Publication Data

US 2013/0117554 A1 May 9, 2013

Related U.S. Application Data

(60) Provisional application No. 61/578,389, filed on Dec. 21, 2011.

(51) Int. Cl.
*H04L 9/08* (2006.01)
*H04L 9/32* (2006.01)

(52) U.S. Cl.
CPC ............. *H04L 9/08* (2013.01); *H04L 9/0891* (2013.01); *H04L 9/3268* (2013.01)

(58) Field of Classification Search
CPC . H04L 9/30; H04L 9/08; H04L 9/0891; H04L 9/3268
USPC ........................................................ 380/282
See application file for complete search history.

(56) References Cited

U.S. PATENT DOCUMENTS

| 5,887,063 | A | 3/1999 | Varadharajan et al. |
| 6,148,404 | A | 11/2000 | Yatsukawa |
| 6,301,661 | B1 | 10/2001 | Shambroom |
| 6,581,113 | B1 | 6/2003 | Dwork et al. |
| 6,681,017 | B1 | 1/2004 | Matias et al. |
| 7,082,536 | B2 | 7/2006 | Filipi-Martin et al. |
| 7,577,729 | B1 | 8/2009 | Umbehocker et al. |
| 7,653,810 | B2 | 1/2010 | Thornton |
| 7,707,405 | B1 | 4/2010 | Gilman et al. |
| 8,316,429 | B2 | 11/2012 | Long et al. |
| 8,724,816 | B2 | 5/2014 | Shi et al. |
| 8,776,192 | B2 | 7/2014 | Schiefelbein |
| 9,026,805 | B2 | 5/2015 | Acar et al. |

(Continued)

FOREIGN PATENT DOCUMENTS

| WO | 2013/009621 A1 † | 1/2013 |
| WO | 2013009621 | 1/2013 |
| WO | WO-2013093209 A1 | 6/2013 |

OTHER PUBLICATIONS

Daniel J. Barrett and Richard E. Silverman, "SSH, the Secure Shell, THe Definitive Guide", Mar. 13, 2001, O'Reilly, pp. 1-542.*

(Continued)

*Primary Examiner* — Luu Pham
*Assistant Examiner* — Canh Le
(74) *Attorney, Agent, or Firm* — Robert P. Michal, Esq.; Carter, DeLuca, Farrell & Schmidt, LLP

(57) ABSTRACT

Management of user keys for public key authentication using the SSH in large SSH deployments is automated by deploying a management system in the environment, discovering SSH identity keys and authorized keys, analyzing authorized connections between user accounts, and automatically managing the authorized connections and the key pairs used for authentication.

28 Claims, 33 Drawing Sheets

(56) References Cited

U.S. PATENT DOCUMENTS

| | | | |
|---|---|---|---|
| 9,336,324 B2 | 5/2016 | Lomme et al. | |
| 2002/0161604 A1* | 10/2002 | Kardos et al. | 705/1 |
| 2002/0191619 A1 | 12/2002 | Shafer | |
| 2003/0033521 A1* | 2/2003 | Sahlbach | 713/156 |
| 2004/0205229 A1* | 10/2004 | Stojancic | G11C 7/1006 709/236 |
| 2005/0081029 A1 | 4/2005 | Thornton | |
| 2006/0206922 A1 | 9/2006 | Johnson et al. | |
| 2006/0236096 A1 | 10/2006 | Pelton et al. | |
| 2006/0248082 A1 | 11/2006 | Raikar | |
| 2006/0259950 A1 | 11/2006 | Mattsson | |
| 2007/0083665 A1* | 4/2007 | Miao | H04L 41/0213 709/230 |
| 2007/0118735 A1 | 5/2007 | Cherrington | |
| 2007/0199072 A1* | 8/2007 | Plummer | 726/26 |
| 2008/0040775 A1 | 2/2008 | Hoff et al. | |
| 2008/0189774 A1* | 8/2008 | Ansari | G06Q 30/04 726/7 |
| 2008/0222416 A1 | 9/2008 | Kiwimagi et al. | |
| 2009/0106551 A1 | 4/2009 | Boren et al. | |
| 2009/0138703 A1 | 5/2009 | Schneider | |
| 2009/0185685 A1 | 7/2009 | DeRobertis et al. | |
| 2009/0199290 A1 | 8/2009 | McCullough et al. | |
| 2009/0285399 A1 | 11/2009 | Schneider | |
| 2010/0100778 A1 | 4/2010 | Sullivan | |
| 2010/0235635 A1* | 9/2010 | Kshirsagar et al. | 713/168 |
| 2011/0038482 A1 | 2/2011 | Singh et al. | |
| 2011/0185055 A1 | 7/2011 | Nappier et al. | |
| 2011/0196893 A1 | 8/2011 | Bates et al. | |
| 2011/0197065 A1 | 8/2011 | Stauth et al. | |
| 2011/0225467 A1 | 9/2011 | Betzler et al. | |
| 2011/0252459 A1* | 10/2011 | Walsh et al. | 726/4 |
| 2011/0276695 A1* | 11/2011 | Maldaner | H04L 41/00 709/226 |
| 2011/0291803 A1 | 12/2011 | Bajic et al. | |
| 2011/0302400 A1* | 12/2011 | Maino et al. | 713/2 |
| 2012/0096263 A1 | 4/2012 | Shi et al. | |
| 2012/0151563 A1 | 6/2012 | Bolik | |
| 2012/0204032 A1 | 8/2012 | Wilkins et al. | |
| 2012/0266209 A1 | 10/2012 | Gooding et al. | |
| 2013/0086092 A1* | 4/2013 | James et al. | 707/758 |
| 2013/0111561 A1 | 5/2013 | Kaushik | |
| 2013/0117554 A1 | 5/2013 | Ylonen | |
| 2013/0227286 A1 | 8/2013 | Brisson | |
| 2013/0298182 A1 | 11/2013 | May | |
| 2014/0075567 A1 | 3/2014 | Raleigh et al. | |
| 2014/0164774 A1 | 6/2014 | Nord et al. | |
| 2014/0215217 A1 | 7/2014 | Gronowski et al. | |
| 2014/0317409 A1* | 10/2014 | Bartok et al. | 713/171 |
| 2015/0013000 A1 | 1/2015 | Linnakangas et al. | |
| 2015/0222604 A1 | 8/2015 | Ylonen | |
| 2016/0044035 A1 | 2/2016 | Huang | |

OTHER PUBLICATIONS

Dell-Michael, Setting up Certificate Authority Keys with OpenSSH version 5.4+, Sep. 8, 2011, pp. 1-3.*
Huixiang Zhou et al., "A New Solution of Data Security Accessing for Hadoop Based on CP-ABE," IEEEE, 2014, pp. 1-4.*
Robert Aiken et al., "Public Key Infrastructure for DOE Security Research: Findings from the U.S. Department of Energy, Joint Energy Research/Defense Programs Computing-Related Security Research Requirements, Workshop II," Jun. 1997, pp. 1-50.*
International search report, dated Mar. 18, 2013.
Written opinion of the international searching authority, dated Mar. 18, 2013.
Kent, Greg: Unsecured SSH—The Challenge of Managing SSH Keys and Associations, SecureIT Whitepaper, 2010.
Venafi Encryption Director—SSH Key Management Guide. Venafi, Inc., Jul. 27, 2011.
Module SSH Auth Patterns—Puppet. Puppet Labs, Dec. 29, 2009.
Puppet ssh::auth module source code, downloaded from sourceforge Apr. 3, 2013.
International Preliminary Report on Patentability for international application PCT/FI2012/051294, dated Feb. 17, 2014.
D. Arkhipkin et al., An SSH key management system: easing the pain of managing key/user/account associations, Journal of Physics: Conference Series, International Conference on Computing in High Energy and Nuclear Physics (CHEP'07), 2008, 072005, vol. 119, IOP Publishing Ltd, Bristol, United Kingdom.
Supplementary European Search Report of EP Application No. 12859641, dated Aug. 14, 2015.
XP-002342178, Applied Cryptography, Second Edition, Passage, Jan. 1, 1996, Applied Cryptography: Protocols, Algorithms and Source Code in C, John Wiley & Sons, New York, pp. 56-59.
Singaporean Search Report of Application No. 11201403482T dated Sep. 4, 2015, 4 pages.
Singaporean Written Opinion of Application No. 11201403482T, dated Sep. 10, 2015, 5 pages.
Stonegate 5.0 FirewallNPN Evaluator's Guide, Stonesoft, Secure Information Flow, 12 pages—2009.
Key Management Interoperability Protocol (KMIP) Addressing the need for Standardization in Enterprise Key Management, Version 1, May 20, 2009.
SSH Tectia, SSH Tectia® Manager 6.1 Product Description, Dec. 15, 2010.
Dell-Michael, Setting up Certificate Authority Keys with OpenSSH version 5.4+, Sep. 8, 2011. pp. 1-3.
'An SSH Key Management System: Easing the pain of Managing Key/User/Account Associations, International Conference on Computing in High Energy and Nuclear Physics, Journal of Physics: Conference Series 119, IOP Publishing, 2008 (pp. 1-6).
David Wagner, UC Berkeley, Object Capabilities for Security, Jul. 6, 2017, 30 pages.
U.S. Appl. No. 61/505,972, filed Jul. 6, 2012 made available under the PCT the WIPO website on Jan 17, 2013. First Named Inventor: Bartok, Peter D.†

* cited by examiner
† cited by third party

USER KEY MANAGEMENT FOR THE SECURE SHELL (SSH)

CROSS-REFERENCE TO RELATED APPLICATIONS

This application claims the benefit of U.S. provisional patent application 61/578,389, filed Dec. 21, 2011.

INCORPORATION-BY-REFERENCE OF MATERIAL SUBMITTED ON ATTACHED MEDIA

Not Applicable

TECHNICAL FIELD

The present invention relates to computer and network security, particularly to the management of credentials for secure access to computers using the Secure Shell (SSH) protocol.

BACKGROUND OF THE INVENTION

The Secure Shell (SSH) protocol is one of the most widely used cryptographic protocols today. SSH is frequently used for remote administration, secure file transfers, backups, and process-to-process communication. Given that IPSec operates on the packet level and is mostly applicable for Virtual Private Networks, not so much for application-level connections, and that the Secure Sockets Layer (SSL) (and its newer version, the Transport Layer Security (TLS) protocol) are suffering from fundamental security problems (particularly, their dependence on certificates and PKI for authentication, and breach of any certificate authority (CA) key in the world allows a certificate to be created for any user or host), the use of the SSH protocol can be reasonably expected to increase in the future.

The SSH protocol is described in the Internet Engineering Task Force (IETF) standards RFC 4250 The Secure Shell (SSH) Protocol Assigned Numbers, RFC 4251 The Secure Shell (SSH) Protocol Architecture, RFC 4252 The Secure Shell (SSH) Authentication Protocol, RFC 4253 The Secure Shell (SSH) Transport Layer Protocol, and RFC 4254 The Secure Shell (SSH) Connection Protocol. The original protocol was invented and developed by the present inventor in 1997-1999, and then standardized by the IETF. The above mentioned RFCs are hereby incorporated herein by reference in their entirety. They are freely available for download at www.ietf.org.

The SSH protocol and related client and server software applications are now included in nearly all Unix and Linux versions, such as IBM AIX, HP-UX, Solaris, Red Hat, SUSE, Ubuntu, etc. Popular implementations of the SSH protocol include the open source OpenSSH, which is based on the present inventor's free SSH version 1.12 from 1995, and the commercial Tectia SSH client (also called ssh.com SSH) and server from SSH Communications Security (Tectia Corporation).

The largest enterprises in the world have hundreds of thousands of computers and up to about a hundred thousand servers running various versions of Unix, Linux, and Windows operating systems on their network. Large enterprises commonly run thousands of different business applications that interact with each other and transmit data and files to/from each other in an automated fashion. A large enterprise typically has tens of thousands of hosts running SSH servers.

In this specification, a host means a computer (whether client or server or something else), or computing node on a network, typically having an IP address and name (though some hosts have more than one IP address (IPv4 or IPv6) and/or name, and some may not have a name at all; typically the names are stored in DNS, the Domain Name System, and/or Active Directory or WINS (NBNS)). A host can also be a virtual machine (e.g., running under WwWare).

To automate file transfers and other communication between computers and applications, companies typically use public key authentication according to the SSH protocol. Public key authentication and how to set it up is described in RFC 4252 and the books D. Barrett et al: SSH, the Secure Shell: The Definitive Guide, O'Reilly, 2001; H. Dwivedi: Implementing SSH: Strategies for Optimizing the Secure Shell, Wiley, 2004; and A. Carasik: Unix Secure Shell, McGraw-Hill, 1999; which are hereby incorporated herein by reference.

Generally, public key authentication is just one method for implementing passwordless logins. A passwordless login is a mechanism whereby a program running under a user account on one host can gain access to a second account on another machine (though they could also be the same account and same machine), without needing to have an interactive user supply a password. Other mechanisms could include, e.g., hard-coding a password or supplying it on a command line. However, with the SSH protocol the public key authentication is usually the preferred method, because with it one cannot gain access to the private key (the authentication credential in this case) from the second account. In some cases, host based authentication and Kerberos authentication can also be used for passwordless logins.

Some organizations use public key authentication to grant authorizations and access rights to individual users. A user is given authorization to log into certain accounts based on the user's role. For example, an Oracle administrator might be given a private key that authorizes the administrator to log into any Oracle database account in his/her department. When a user's role changes, the old access rights would be removed and new ones might be added in accordance with the new role. Removing the user's access basically means de-authorizing the access.

Yet another use of public key authentication is to allow administrators to log into shared accounts on jump servers that can then be used to access numerous other systems, such as point-of-sale terminals in a retail environment.

In large organizations, the number of different file transfers and authentications that they manage grows very large, and such organizations typically have hundreds of system administrators each managing some hundreds of computers. It is very difficult for security administrators to keep track of what authorized public key login connections exist, what each connection is used for, and when the connection can/should be removed. It is currently practically impossible for organizations to renew the authentication keys, which any prudent security practice would require. Furthermore, there is currently no practical way for the organizations to prevent an administrator from copying the private key, and continuing to use the private key after changing roles or leaving the job, and many organizations never remove authorized public keys because it is too difficult and expensive.

Some large enterprises are known to have over a hundred thousand public-private key pairs used as SSH authentication keys. Many large enterprises have sizable teams setting up SSH authentication keys. The problem appears to be present in nearly all F500 companies and many of the next 10 000 large companies. Therefore, the combined cost of managing key pairs and authorizations in large enterprises worldwide is substantial.

BRIEF SUMMARY OF THE INVENTION

Certain embodiments of the present invention attempt to alleviate the cost of managing public and private keys for authentication in large organizations and to improve the security of their computing infrastructure by enabling authentication key removals, key renewals, and proper auditing of existing access rights. The invention comprises many aspects, some of which can also be used independently in other contexts. Some of the aspects also relate to managing SSH host keys, in combination with user key management or separately. Some of them are also applicable to certificate management for other protocols, such as SSL, TLS, or IPSec. The invention is not intended to be limited to the described applications, embodiments, or aspects nor is it intended to be limited to solving all or any of the objects of the invention or to provide all or any of the benefits listed herein. The scope of the invention is only limited by the claims read in light of the specification. When "an embodiment", "one embodiment", or "another embodiment" is described, they refer to particular embodiments or classes of embodiments (or variations of a broader class of embodiments), not necessarily to the same embodiment. The aspects, embodiments, and elements of the invention may be used in any combination to form a new aspect or embodiment of the invention, including but not limited to method, apparatus, computer readable medium, and data structure embodiments.

BRIEF DESCRIPTION OF THE SEVERAL VIEWS OF THE DRAWING(S)

DETAILED DESCRIPTION OF THE INVENTION

The various aspects of the invention will now be described in view of the drawings. It is clear to a person skilled in the art that many variations of the embodiments are possible; for example, method steps could be rearranged, divided, combined, or executed by different parts of a system or apparatus, and any action indicated as performed may just be caused to be performed (and actually executed by a different component). Some flowcharts include steps that may be omitted in another embodiment. In many cases, flowchart steps may be performed in quick sequence, but in some embodiments performing a step in a flowchart may take weeks or months as in large-scale environments a computer might have a maintenance window only, e.g., once per month, and updates need to be limited to such maintenance windows, or the entire infrastructure might be locked down from changes for months (e.g., during a typical lock-down period before Christmas in the retail industry). Also, since many of the described steps are something a management system must perform (cause to be performed) on a managed computer, and the managed computer may be unavailable at any given time due to system crashes, network outages, maintenance, testing, or other reasons, the management system should normally be able to retry actions that were not successful initially at a later time. A higher-level flowchart might only continue after an earlier operation has been completed on all related computers. One must also take into account that a computer may break and be decommissioned at any time, and the management system should eventually complete any outstanding operations for such decommissioned systems in order to not leave related higher-level operations incomplete (which might at least confuse users). Given the examples herein, a person skilled in the art should be able to implement the required details in the other embodiments as well (not all described embodiments include all the details to improve clarity and keep the length of the description reasonable).

This specification generally assumes that the reader is familiar with enterprise security, encryption protocols, SSH, basic IP networking concepts, basic firewall concepts, Unix/Linux, Windows, and relational databases, as might be expected from, e.g., a programmer with a background in large system administration and network security or from a development team in this area.

Figure 1:
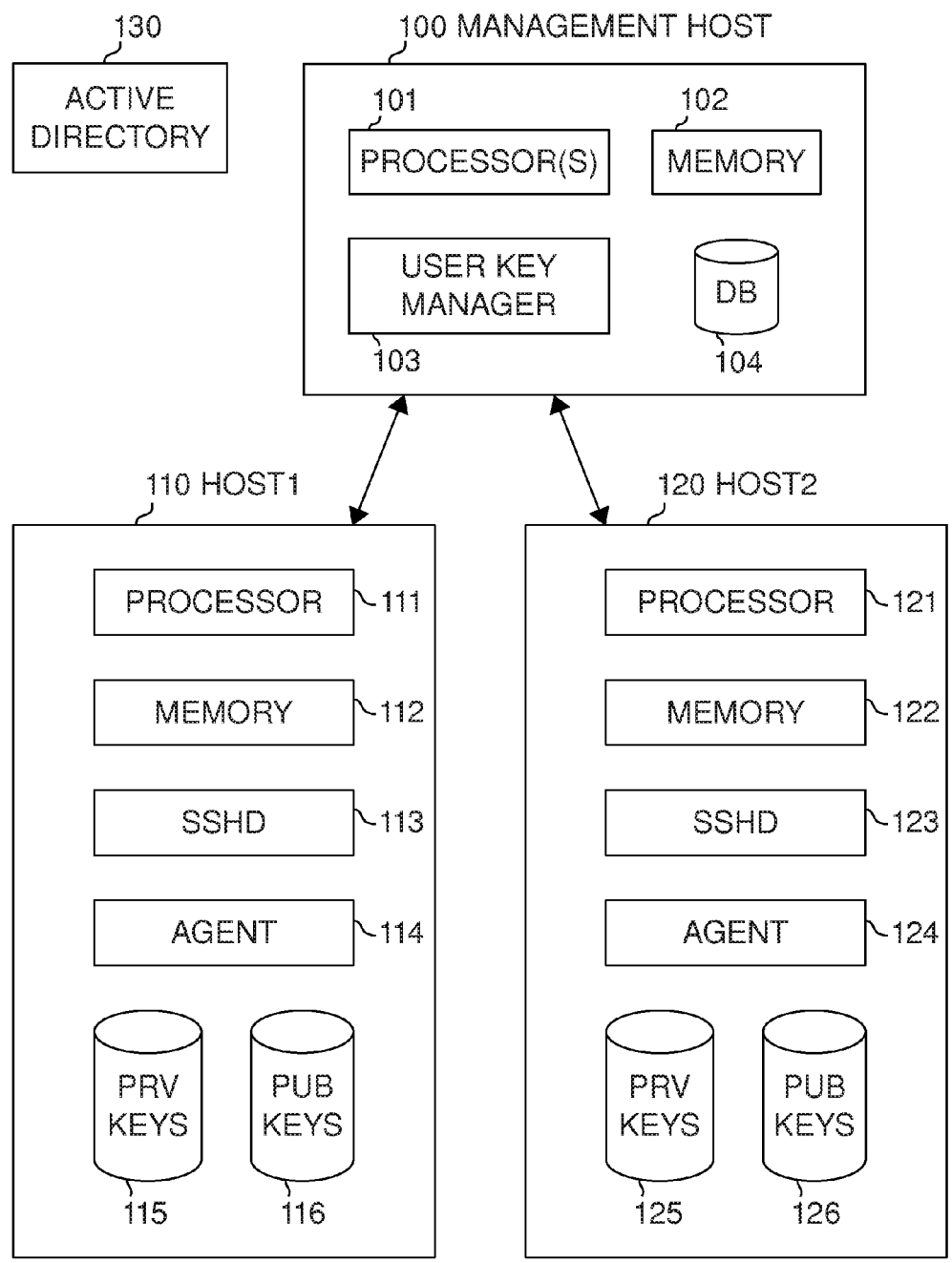
FIG. 1 illustrates a management system for managing SSH keys in an embodiment.

FIG. 1 illustrates the architecture of a user key management system for SSH (though generally the same architecture could also be used for host key and configuration management). User key management for SSH refers to the management of the public-private key pairs used for public key authentication of users according to the SSH protocol and the management of the related aspects of SSH server and client configuration files. The management host (100) comprises one or more processors (101), such as Intel Xeon processors, memory (102), such as SDRAM memory, a computer-readable non-volatile memory organized into a database or file system for storing information (104), and software for managing SSH user authentication keys (103). The term "host" is used to mean a computer or generally any node or apparatus in the network that has its own IP address and/or domain name (though the definition is somewhat fuzzy, and some hosts can be multi-homed, that is, have more than one IP address or more than one domain name). A computer can be any kind of computer, such as general purpose computer, embedded system, mainframe, mobile device, cluster of computers, or a distributed computer. In addition to the components mentioned, a computer also comprises other components normally understood to be included in a computer, such as power supplies, enclosures, displays, I/O devices, disk drives, network interfaces, buses, motherboards, etc. Any current or future technology may be used for implementing the computer, and any described component or method may be implemented as hardware logic or state machines or as software state machines or programs. A computer may also be any apparatus with data processing capability, such as a robot, vehicle, communication system, industrial control system, point-of-sale system, handheld terminal/scanner, etc.

The user key manager (103) communicates with a database/storage system (104). It may run on a single computer, or it may run on multiple computers in a distributed fashion (e.g., multiple back-ends handling communication with managed computers and one or more front-ends providing a web-based user interface to administrators), and the database may be on the same computer or on a different computer (advantageously, it is a distributed database supporting replication, such as an Oracle or a MySQL database). For simplicity, they are described as a single system on a single host in this drawing.

The management system communicates with one or more managed hosts (110, 120). The communication is advantageously over an IP network (e.g., IPv4 or IPv6), and may be through intermediate switches, routers, firewalls, NAT, etc. It may also utilize co-operating devices, such as hosts acting as management back-ends facilitating communication with and performing actions on managed hosts. It may also be through proxy agents that handle agentless management of hosts on which running an agent is not possible or desirable for whatever reason, and may use connectors (software modules implementing operations on a particular type of machine/software, often custom-made as part of an integration project) to implement management of otherwise unsupported or special platforms.

Advantageously, all essential state of the management system is stored in the database, and the management back-ends and proxy agents can be restarted at any time without disrupting the operation of the management system or allowing requests to go unprocessed. Thus, requests are advantageously inserted into the database when they are received, and as they are processed, their state in the database is changed.

A managed host typically comprises one or more processors (111, 121), memory (112, 122), an SSH server (113, 123) and/or SSH client, and a management agent (114, 124), unless agentless management is used for the host, a store or database for private keys (115, 125) and for public keys (116, 126). Additionally a managed host may include any other components that may be required in a particular kind of computer or apparatus, as is known in the art.

The management agent is a relatively small piece of software that runs on a managed computer and communicates with the management system. The management agent may connect to the management system regularly (or may maintain constant connection), or the management system may be able to connect to the management agent (typically using TCP/IP, possibly using SSH or SSL/TLS protocol). The management agent typically runs as a daemon or service, but it may also be invoked periodically by, e.g., the cron program on Unix/Linux. It may also be an application program that is invoked via the SSH server (possibly as an SSH protocol "service").

A host may also be managed without an agent. In this case, typically the management system (or some assisting module, such as a proxy agent or connector) would connect to the managed host and log in using password or public key authentication (e.g., using a private key held by the management system to authenticate to the managed host as "root"). The management system could then use this connection to execute commands on the management host and perform file transfers to/from it to perform management actions, such as reading operating system type, SSH server/client version, user data, group data, user information directory (e.g., Active Directory (130) or LDAP) configuration, public keys, etc., deriving public keys or fingerprints from found private keys, and creating new private keys, modify configuration files, add/remove public keys, etc. The output of the various commands executed on the host and the contents of, e.g., read configuration and key files would be parsed to extract information about the host, its configuration, users, keys, etc.

A server host typically has both SSH server and SSH client installed, and may thus have both private keys for public key authentication (these are used by the client) and public keys that are authorized to connect (for the server). Typically each user has his/her own set of keys, and additionally the host has host keys used for host authentication. Some user accounts may be functional accounts (also called process accounts) used by programs running on the host. All of these may be managed by a management system.

Figure 2:
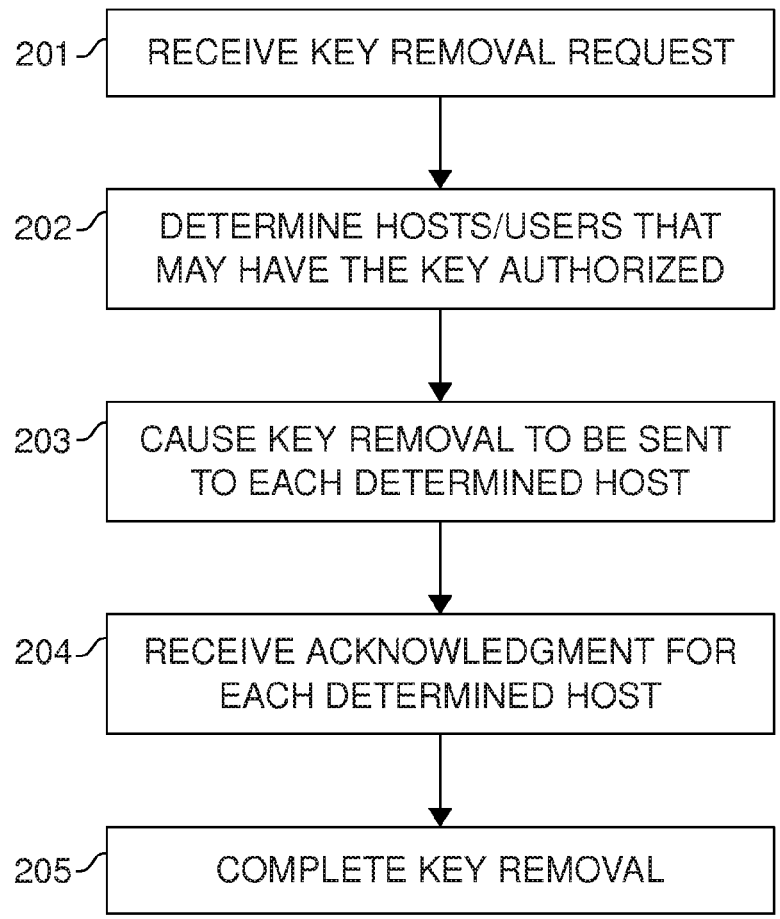
FIG. 2 illustrates processing a request to remove a key from the authorized keys files on all hosts in a management system embodiment.

FIG. 2 illustrates processing a request to remove a public key from the authorized keys files on all managed hosts. This is an operation that should be performed, for example, when a user leaves the company or when a key is no longer used (because its original use is no longer relevant, the key has been renewed, and a new key is now being used), or the key has been compromised (e.g., potentially fallen into the hands of a hacker).

First, a request to remove a key is received (201). The request may come, e.g., from a web-based user interface, an API used to integrate the management system to a ticketing/approval/change control process at the enterprise (e.g., a Web Services 2.0, .NET, or SOAP API), or from a command line. The request may be transmitted, e.g., as a function call, RPC (Remote Procedure Call), HTTP request, message, or through a record in a database.

To process the request, it is determined which hosts may have the key authorized for some user (202) (this may also return hosts where the key is actually not in use, if accurate information is not available). In one embodiment no information is available about which hosts have which keys, and this returns all managed hosts. In another embodiment, a database contains information about which hosts and/or users have the key, and only those hosts are returned. In yet another embodiment, there is another data store that contains information about where the public key is stored (e.g., a file stored on the same host(s) as the private key), and this data store is used to obtain information about which hosts have the key. When it is said that the set of hosts is returned, it is not meant that an explicit set would necessarily be constructed and returned; rather, it is just used to refer to any means for restricting the set of hosts from which the key is looked for.

Then, key removal is caused to be sent to each host that may have the key authorized for some user (203) (if it is known which users have the key, then a request may be sent for each such user on each host where the user may have the key, or many users may be combined into a single request, or, e.g., the request may be sent without a user to cause an agent to scan for the key from all users on the host(s)). The request may be sent via an agent or using agentless management. It may also be stored in a database for later sending (e.g., at a time when there is a maintenance window for the host in question, or when lock-down period ends).

An acknowledgment is then received for each determined host (204). The acknowledgment may come from a host (e.g., by sending a message over the management connection from an agent), a proxy agent implementing agentless management, or the management system itself if, e.g., a host having a pending request is decommissioned and removed from the management system. When acknowledgments have been received for all hosts/users for which a request was sent to a host, the key removal is completed (205) by, e.g., updating its state in a database, sending a confirmation/reply to an API request that initiated the operation, removing the request from a list of pending requests in a user interface, logging request completion, updating statistics, and/or deleting the request from the database. The private key corresponding to the public key may also be deleted (either at this step, or already when removing the public keys). In fact, the original request may specify the key using its public key, its private key, or a fingerprint of the key (IETF SSH-related standards describe at least one way of computing SSH key fingerprint).

Figure 3:
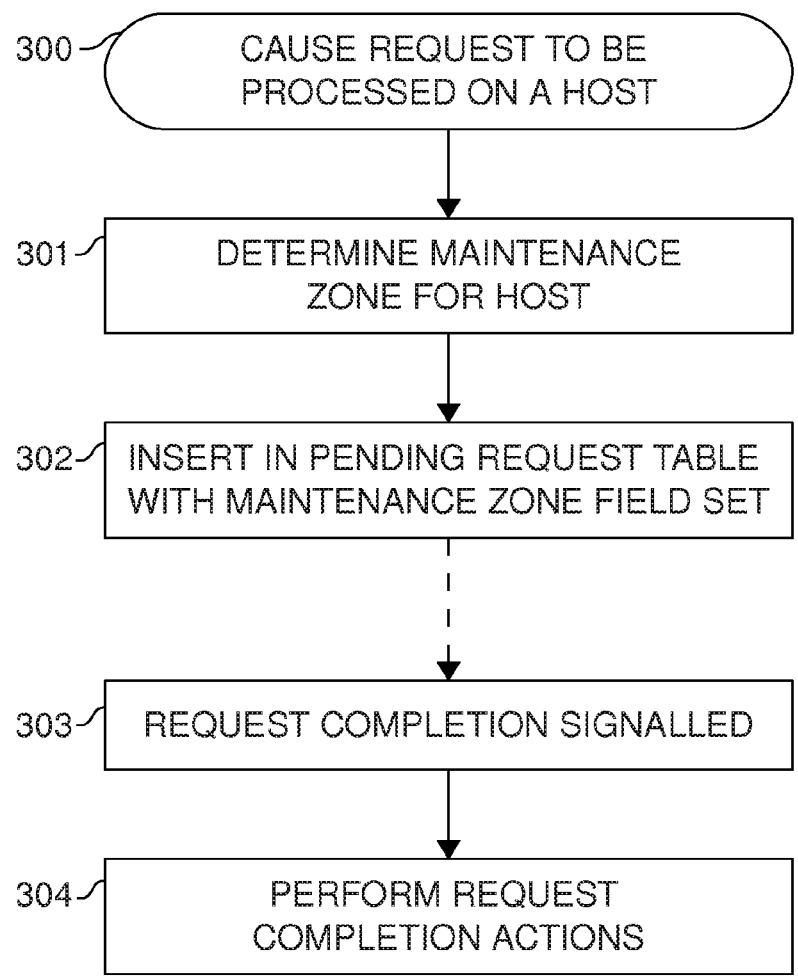
FIG. 3 illustrates causing a request to be processed on a host during a maintenance window applicable for the request in a management system embodiment.

FIG. 3 illustrates causing a request to be processed during a maintenance window on a host (300) (maintenance windows are times when installations and modifications may be made on a computer; sometimes they are also called scheduled downtime or green zones). A host's maintenance window is said to be open when requests can be processed for the hosts. A maintenance window may be indicated for a host, e.g., by associating a host with a maintenance zone (which is essentially a group of hosts having a maintenance window at the same time) or by specifying maintenance window information separately for the host. Maintenance window may be automatically at certain time (e.g., certain time on certain day of each week). In some cases a maintenance window is only available when specially enabled for a host (e.g., by clicking a button that permits maintenance operations or request processing on a host for a certain period of time).

In an embodiment, there is a plurality of designated maintenance zones, and each host is assigned to a maintenance zone. The maintenance zone specifies the time when updates may be made to hosts that belong to the zone. A zone may also specify different times for different types of updates—for example, software installations and upgrades might be permitted only on the second Tuesday each month at 3 am to 4 am, whereas user key additions might be permitted at any time and removals every night from 4 am to 5 am. In some maintenance zones automatic updates might not be permitted at all, and an update can only take place when expressly confirmed by clicking a button in a user interface.

First, a maintenance zone is determined for the host on which the request is to be processed (301). This could, for example, perform an SQL SELECT query to look up the host from a table and read a maintenance zone field for the host record.

Then, a request record is inserted in a pending request table with a maintenance zone field set to the maintenance zone of the host (302). Alternatively, the record could be inserted without the maintenance zone field, and queries for requests in a particular maintenance zone could perform a join of a host table and a request table in a database. If a host is moved from one maintenance zone to another, then in one embodiment all requests for the host are updated to change their maintenance zone field to refer to the new maintenance zone of the host.

The request then remains in the request table until something (e.g., a management back-end node) signals that it is complete (303) (e.g., by starting to process the request after completing it, or by updating its state in a database, causing a completion process searching for completed requests to find it).

Request completion actions are then performed for the request (304). Such completion actions may involve, e.g., changing the state of the request, sending a confirmation to an API request, changing its state in a user interface, and/or signaling to a higher-level request that the request has completed, and continuing processing of the higher-level request if its last outstanding sub-request was completed.

Figure 4:
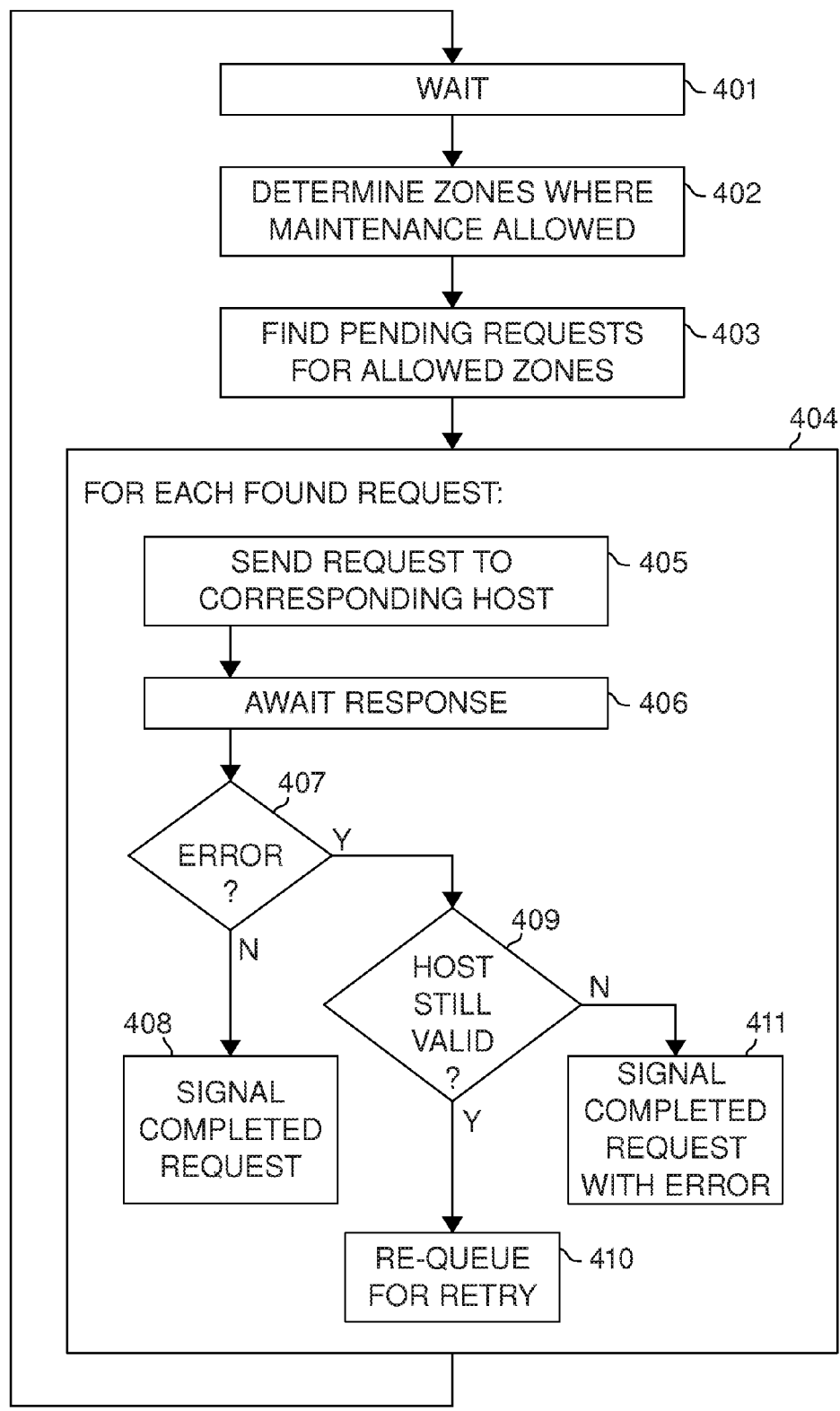
FIG. 4 illustrates processing pending maintenance requests by a repetitive process in a management system embodiment.

FIG. 4 illustrates processing pending requests by a repetitive process.

The wait (401) illustrates waiting before going through the other operations again. The wait may be, e.g., waiting for next invocation by a cron job, timer, or a "sleep" for, e.g., five minutes.

When operation resumes, zones where maintenance is currently allowed are determined (402), e.g., by looping over all zone definitions and checking if now is the allowed time or by having a next window start time in each zone, and looking for zones where the current time is larger than the next window start time (where current time exceeds the end of the window, the next window start time should be updated and the zone not processed). It is also possible to have buttons in a user interface to "start maintenance now" and "stop doing maintenance now", controlling whether maintenance for the zone is currently allowed.

Then, all pending requests for the allowed zones are looked up (403). Some requests may be set to run as soon as possible, without checking whether maintenance for the affected host(s) is allowed, and such requests would also be looked up. In one embodiment a value in a state field in each looked up request record is changed to indicate it is currently being processed, with a timeout value after which it will be assumed inoperative if not completed, in which case it can be automatically restarted.

Then, each looked up request is processed (404). The request is sent to the corresponding host (405), response from the host is waited for (406), return code from performing the request is checked (407), and if no error was detected, execution continues to signal that the request was completed (408) and/or perform other completion actions. If an error occurred, it is checked whether the host is still valid (e.g., has not been decommissioned) (409), and if so, the request is re-queued and will be retried later (410) (re-queueing may involve, e.g., changing a status field in a database). If the host is no longer valid (it is known that the request will not be completed), it is signaled that the request has completed with an error (411) and/or other completion actions are performed.

In one embodiment a request is sent to a host by connecting to the host using the SSH protocol, obtaining a shell (command interpreter) at the remote computer, and sending commands to the remote shell over the SSH protocol and reading responses. In another embodiment an agent program running on the remote host connects to the management system using the SSH protocol (authenticating the management system by its host key and authenticating into the management system using, e.g., public key authentication) and runs a shell at the client side, allowing the management to send commands to the shell and read responses. In one embodiment the agent program runs constantly and periodically connects to the management system; in another embodiment the agent program is periodically run as a "cron job". The agent may be able to execute requests such as "receive file", "send file", "cause SSH server to reread its configuration file".

In one embodiment a request to be performed on a host is divided into multiple sub-requests or commands sent to the host. The sub-requests or commands may be operating-system or SSH version specific; the management system may obtain the remote host's operating system version, e.g., by running the "uname—a" command on the remote host, or reading Windows version using agent and sending the version to the management system.

Figure 5:
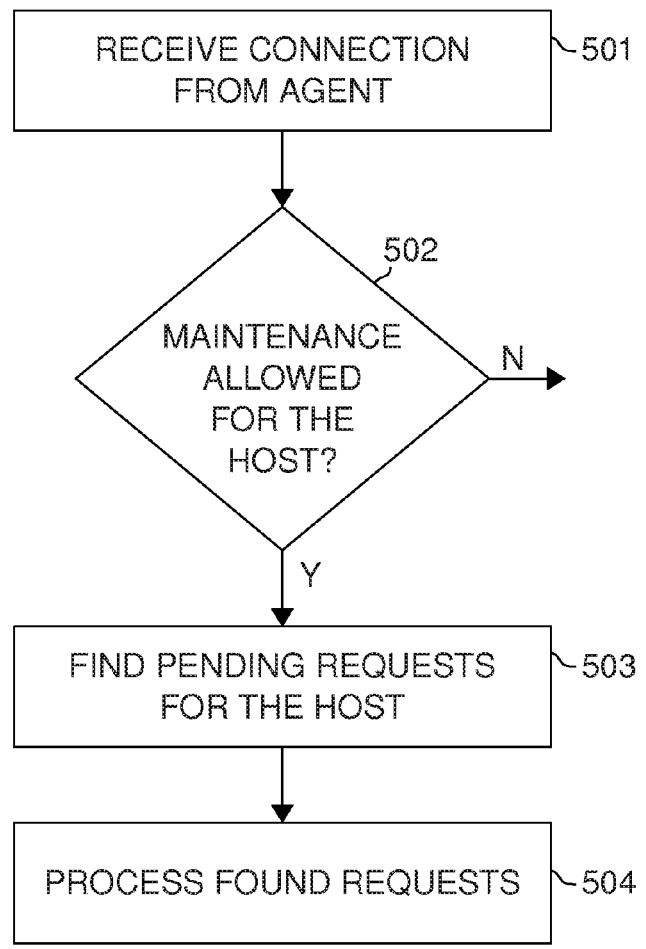
FIG. 5 illustrates handling a connection from a management agent in a management system embodiment.

FIG. 5 illustrates handling a connection from a management agent in a management system. First the connection is received (501), then it is checked if maintenance is allowed for the host (502) (e.g., by looking up its maintenance zone and checking whether maintenance is allowed for the zone). Then, pending requests for the host running the management agent are looked up (503), and they are processed (504). In one embodiment the actions after receiving the connection are inside a loop and are repeated as long as maintenance is allowed and there are pending requests for the host, processing one request at a time.

Figure 6:
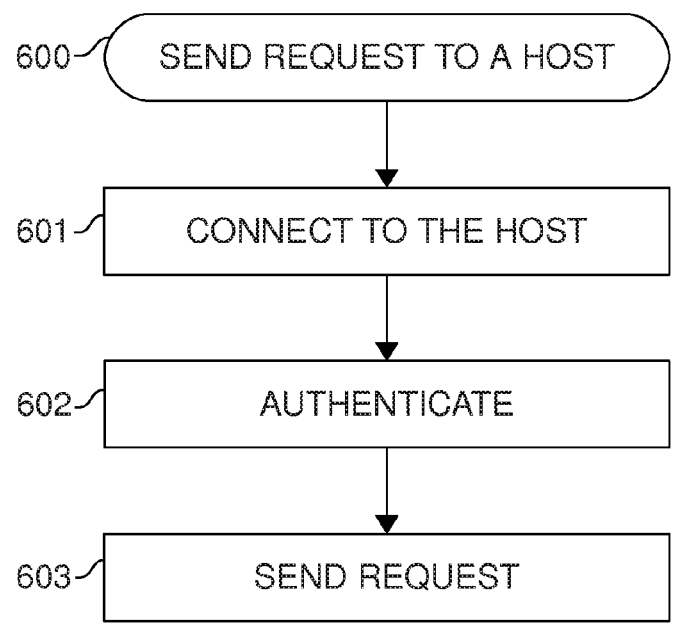
FIG. 6 illustrates sending a request to a host in an agentless host embodiment or in an embodiment where the management system contacts a management agent at a host.

FIG. 6 illustrates sending a request to a host in an agentless host embodiment or in an embodiment where the management system contacts a management agent at a host (600). First, the management system connects to the host (601) and authenticates to the host (602), e.g., using the SSH protocol and public key authentication as root or other suitable privileged user. Having a connection, the management system sends one or more requests to the host (603) (possibly in a loop as in the case where an agent establishes the connection).

Figure 7:
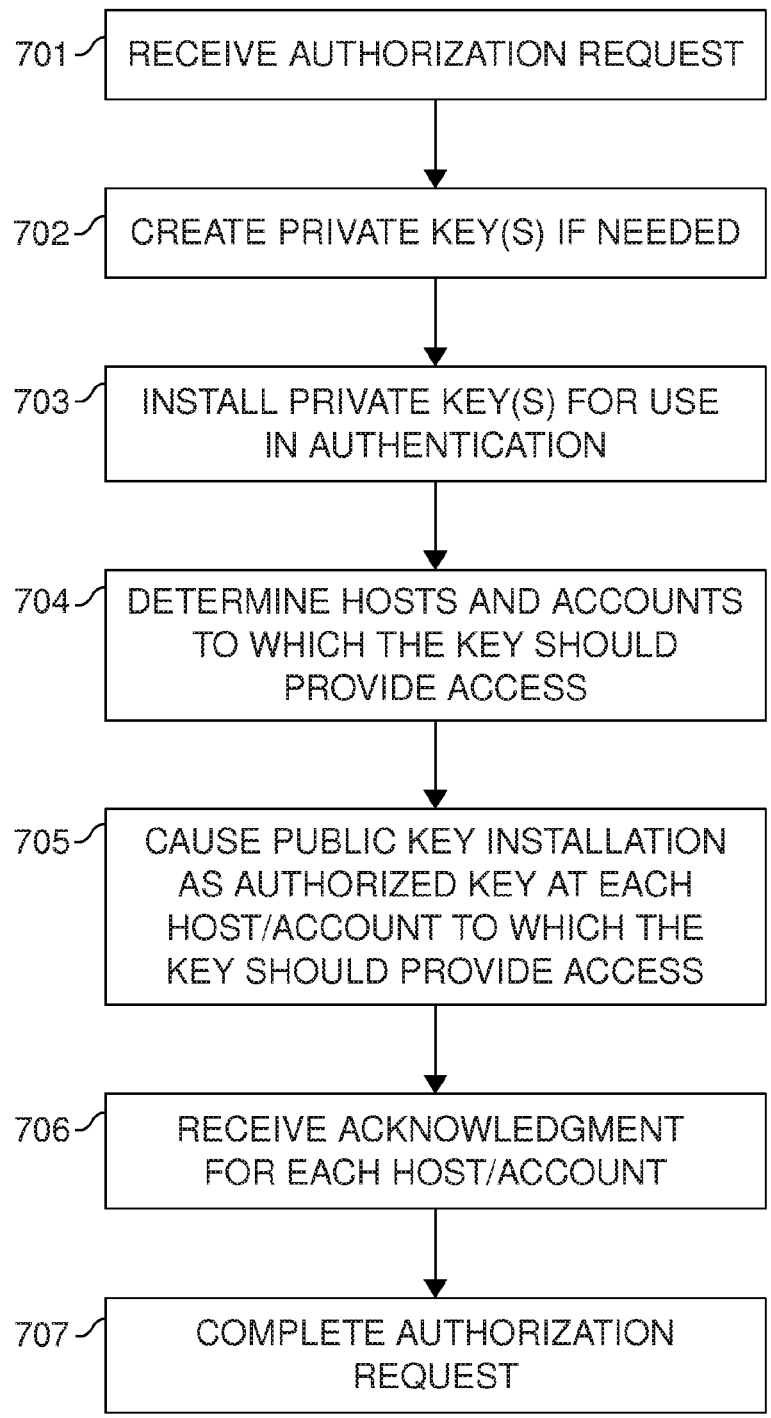
FIG. 7 illustrates processing a request to authorize a first account to log in as a second account in a management system embodiment.

FIG. 7 illustrates processing a request to authorize a first account to log in as a second account. First an authorization request is received (701). If the first account does not yet have a private key, a private key is created (or caused to be created) for it (702), for example, by sending a request to this effect to an agent or connecting to the host using SSH and running the ssh-keygen command without an agent. The resulting private key is then added to SSH configuration files as needed to make it usable for public key authentication (703), as an identity key. In some embodiments the host may actually be multiple hosts (e.g., in a cluster), and they may be made to share the same private key for the account. The public key corresponding to the private key is copied to the management system and from there to the host of the second account (though, in one embodiment it is copied directly from the first account to the host where it is needed).

Then, it is determined which host(s) and accounts the public key should be added to as an authorized key (704). In some embodiments the destination account may be present on many different hosts, or may refer to a clustered host, and the host key may actually need to be copied to multiple hosts (see description for later drawings). Then, the management system causes the public key to be installed on each of the determined hosts (if any) for the account(s) to which the key should provide access (705). This may involve inserting sub-requests in a table, and changing the status of the current request to indicate that it needs completion signals from the sub-requests. The sub-requests could have a field identifying their higher-level (parent) request. (Generally, processing received higher-level requests may involve inserting the request into a table in a database, and executing it using management back-end hosts, tracking the state of the request in the database).

As each request is processed, an acknowledgment is received for each completed sub-request (706), and when all sub-requests are complete, the authorization request is complete (707), its completion is signaled and/or the API notifies a ticketing system that the request has been processed, removes it from a pending list in the user interface, etc.

Advantageously, when a request is received from a change control/approval system (whether implemented as a separate software system or as part of the management system), the request is tagged with a reference to the change control ticket explaining its creation and related approvals. Advantageously, when information about keys is stored and available in the management system, the reference is made available in the user interface, and a means (e.g., an HTML link) is provided for viewing the associated request.

Figure 8:
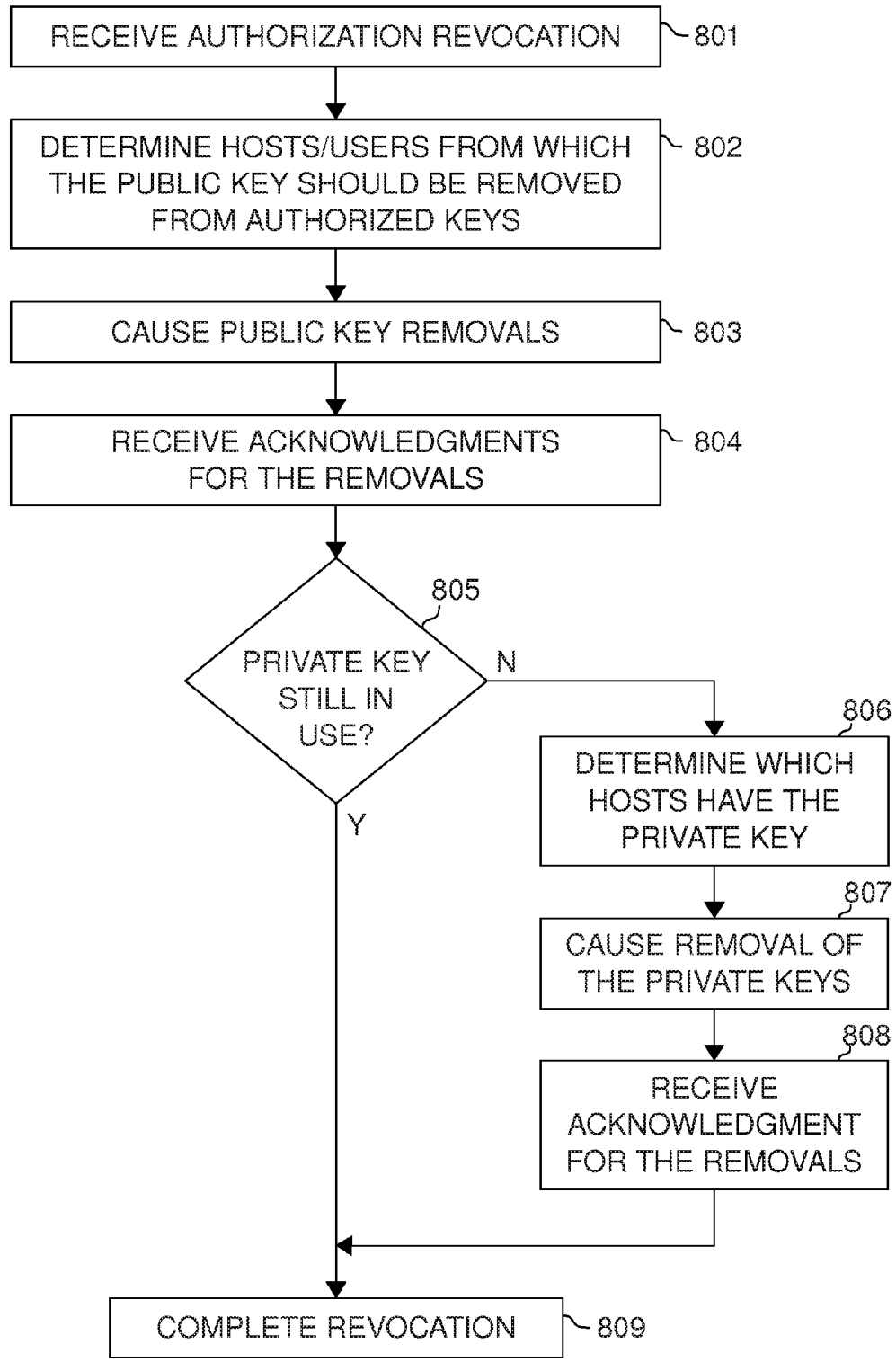
FIG. 8 illustrates processing a request to revoke authorization of a first account to access a second account in a management system embodiment.

FIG. 8 illustrates processing a request to revoke authorization of a first account to access a second account. First, the request is received (801), the affected hosts/accounts are determined (802), the public keys to be removed are caused to be removed (803) by creating sub-requests for them, and acknowledgments for the sub-requests are received (804). It is checked whether the private key is still needed (805) (whether the corresponding public key still exists for some account), and if not, it is determined which host(s) have the private key (806), sub-requests are created to remove the private key (807), acknowledgment of completion of the sub-request is received (808), and completion of the authorization revocation request is signaled (809) and/or related actions performed.

When determining the affected hosts/accounts in (704) and (802), it is advantageous to have information in a database about keys and where each key is stored. The tables would first be constructed during a discovery phase, and thereafter updated whenever new keys are found or added using the management system or removed by the management system (or otherwise). For example, one could have a table "pubkeys", with fields "host", "user", and "keyid" used for storing information about keys. Hosts and users having a particular key could be found by selecting records by the "keyid" field.

To find hosts and users affected by addition of an account, one must consider clusters of computers (see below) and accounts that are present in multiple hosts in the managed environment, as well as requests that refer to groups of accounts. Advantageously, the managed environment has a set of accounts (stored in a directory service, e.g., Active Directory, LDAP, NIS) that exist accessible on more than one computer (which may or may not have shared home directories). For accounts in a directory service, a method exists for mapping the identity of a user into a login name on a particular host (in one embodiment, the user name is stored in a field of the User object in Active Directory or LDAP, and the method comprises looking up the user object from the directory and reading the user name field from the object).

In one embodiment authorizations can be requested or revoked only for functional accounts, and the management system denies any requests to authorize connections between interactive user accounts or between an interactive user account and a functional account.

In one embodiment the accounts may be groups of users/accounts, and the request means to authorize any of the accounts in the first group to access any of the accounts in the second group. In this case the request may be processed as a separate request for each user in the first group, and steps (704) and (802) extract the hosts and users to which the second group maps.

How a group is mapped to users and hosts depends on the group. If the group comprises a list of accounts, then the group is expanded to include those accounts. If a group is defined in a /etc/group file on some computer, then it includes those users on that computer listed on the line for the group in question in that file (the /etc/group file contains lines that begin with a group name, then a colon, and then a comma-separated list of group member user names). If a group is defined using Organizational Unit (OU) fields in Active Directory or LDAP, the group includes those accounts whose OU field(s) match those specified in the group constraints, and can be determined by making a query against the directory with the OU constraints in place (and similarly for other constraints on the distinguished name or other attributes of the User objects in the directory).

Figure 9:
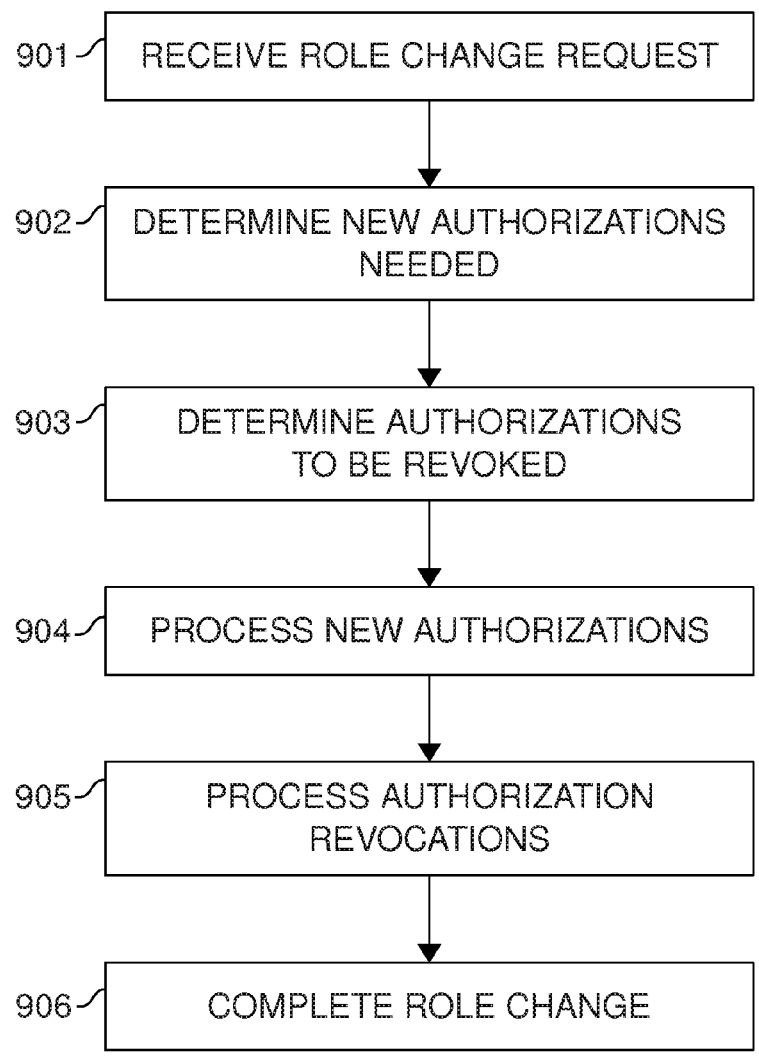
FIG. 9 illustrates processing a role change request for an account in a management system embodiment where a role implies certain access rights specified for the role.

FIG. 9 illustrates processing a role change request for an account where a role implies certain access rights specified for the role. The request is received (901), e.g., from a user interface or API (possibly indirectly through a database), it is determined which new authorizations are needed (902), it is determined which authorizations should be revoked (903), the new authorizations are processed (904), the authorization revocations are processed (905), and completion of the request is signaled (906) and/or other completion actions performed.

The processing of a request may be optimized by first computing which keys at which accounts would need to be removed when the user is detached from the old role, computing which new keys should be added at which accounts for the user's new role, and only deleting those keys that would not be re-added for the new role, and only adding those keys for the new role that are not already in the system (as indicated by the previously described table containing information about stored keys). Similar optimization can be applied to any authorization or revocation request of the type described here.

Generally, a role may imply a set of accounts that the user may access. Thus, giving a user a role is equivalent to authorizing the user to connect to each of the accounts specified for the role, and removing a role from a user is equivalent to removing the authorization for the user to connect to each of the specified accounts (unless authorized by a remaining role). Generally, the role change above was described as if a user can have only one role, but can be easily extended to multiple roles (having multiple roles is roughly equivalent to having "super-roles" that are sets of roles, and imply memberships in the union of the accounts specified for the underlying roles).

Figure 10:
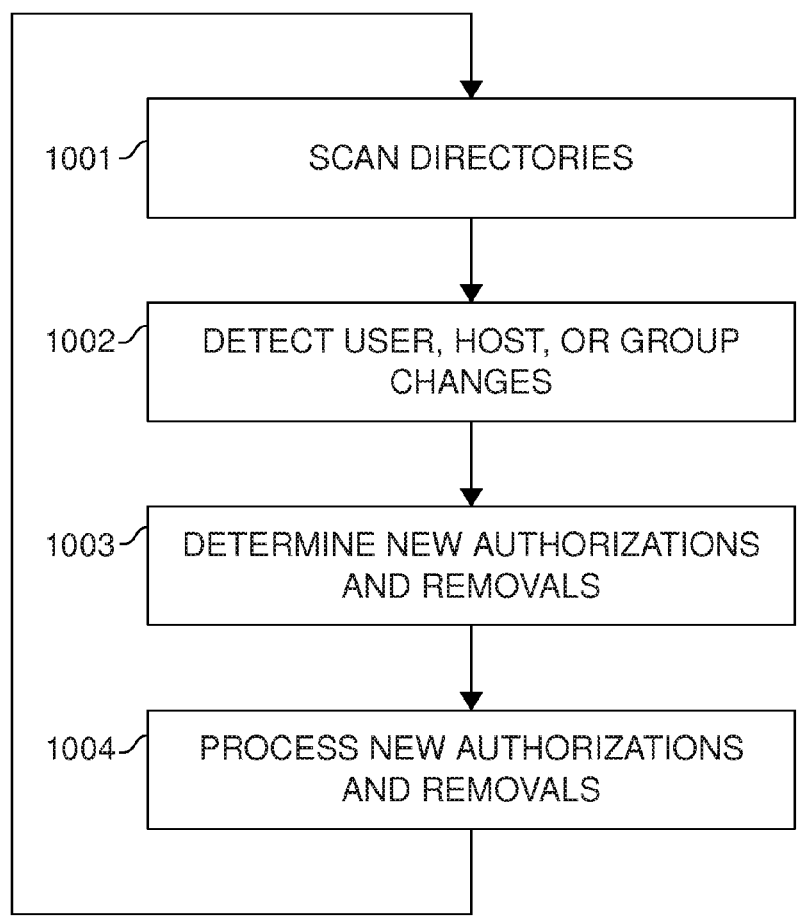
FIG. 10 illustrates scanning one or more user information directories (e.g., Active Directory) for changes to user, group, or host information in a management system embodiment.

FIG. 10 illustrates scanning one or more user information directories (e.g., Active Directory) for changes to user, group, or host information. One or more directories are scanned for changes (1001) (e.g., by making a query to an LDAP directory and enumerating all User, Host, and/or Group objects—the naming of the objects depends on the schema), changes in user, host, or group information are detected (1002), required new authorizations and/or removals of authorizations are determined (1003) and related requests created, and the authorization and removal requests are processed (1004).

There are several possible methods for detecting changes in a directory service. One method is to scan the entire directory (or the areas that may contain relevant objects) and keep a local copy of the directory as it was when last scanned (the local copy need not store the entire objects; it is enough to store some relevant fields, such as the user name and distinguished name, though this depends on the embodiment). Another method is to keep a poll query against the database all the time, the poll query being such that any changed records are returned. A further approach is to have an API (e.g., function call, SOAP API, or command-line command) for indicating that data for a particular user, host, or group has changed; such an API could be used to integrate the management system to an identity and access management system by causing such a system to inform the management system whenever a change is made (perhaps also providing a change tracking/approval reference, which would be beneficial for associating the changes with the appropriate reference).

Often, if a user account is added, the account's roles are specified by the its groups as specified in the directory. The user might thus be automatically given the roles indicated by the groups. Alternatively, roles could be indicated by the user's distinguished name, such as OU fields. If a user's groups or distinguished name changes, it would be handled like a role change.

Not all organizations store host group information in a directory. When they do, addition of a host to a host group may cause all previous authorizations of access using the host group to be re-evaluated. The processing is similar to revoking all accesses granted by the rule, and then re-adding them. This is advantageously implemented using the optimization above. The same applies to removing a host from a host group.

Generally, it is advantageous to record in a database all authorized connections from one account (or group of accounts) to another account (or group of accounts). When there is a change in a group, all rules using any affected group may be revoked and re-authorized (though the process should be optimized so that no keys are unnecessarily removed and then re-added).

The affected groups for a user are those groups that the user is a member of.

The affected groups for a host are those host groups that the host is a member of.

It should be noted that a new request or change may cause a key to be removed before adding it has even been completed. Such situations may be handled by cancelling the request to add it; another alternative is to process requests in order.

When groupings are changed from the user interface, the effect is essentially the same as if they had been changed in a directory.

Figure 11A:
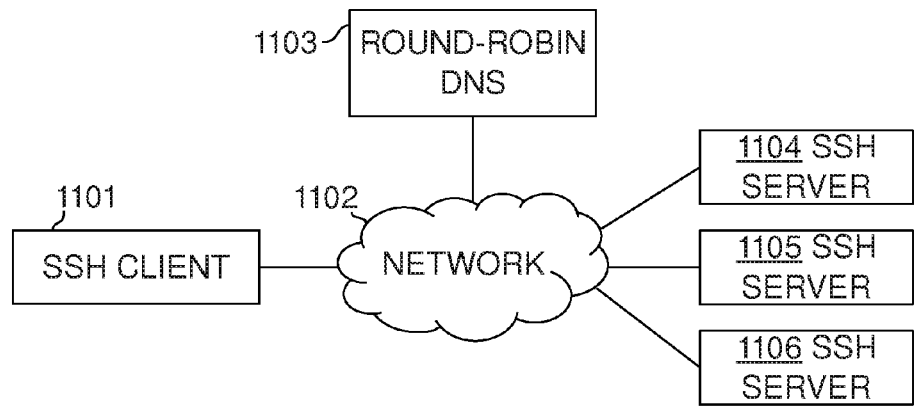
FIG. 11A illustrates a cluster of computers that share a domain name and whose IP addresses are provided in a round-robin fashion by a DNS server and that share the same host key in an embodiment.

FIG. 11A illustrates a cluster of computers that share a domain name and whose IP addresses are provided in a round-robin fashion by a DNS server and that share the same host key in an embodiment.

Round-robin DNS is a mechanism where a DNS (Domain Name Service) server has multiple IP addresses corresponding to a domain name. It returns a list of IP addresses for such hosts (not necessarily all configured addresses). However, round-robin DNS rotates the list so that different queries return the addresses in different order (in round-robin DNS, generally the one returned first in the previous query is moved to the end of the list). Such arrangements are used for load balancing purposes (when all requests are approximately equally expensive, such as with many web sites) and fault tolerance (if one host is down, some requests may fail but most are likely to go through, thus the failure of one host will affect only a small fraction of users).

If an SSH connection is made to a domain name using round-robin DNS, the connection may be made to any of the hosts having the same domain name. Thus, such hosts should be treated as logically equivalent for SSH key management purposes (they should have the same host key or clients should be given all of their host keys as valid keys for the domain name; granting access to one of them should probably grant access to all of them; allowing one of them to make a connection to some account should probably mean allowing any of them to make the connection [with the same private key or different private keys]).

In the figure, an SSH client (1101) is connected to a network (1102) and uses a domain name for which round-robin DNS is used by a DNS server (1103) to connect to any of a plurality of SSH servers (1104, 1105, 1106).

Figure 11B:
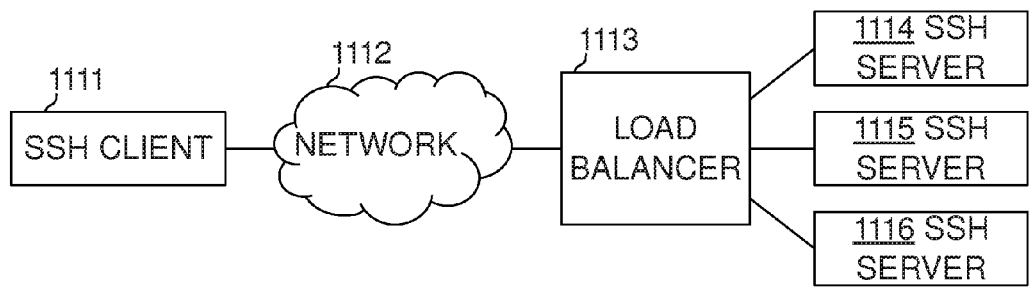
FIG. 11B illustrates a cluster of computers connected to a network via a load balancing device that may redirect a connection to an IP address to any computer in the cluster in an embodiment.

FIG. 11B illustrates a cluster of computers connected to a network via a load balancing device that may redirect a connection to an IP address to any computer in the cluster in an embodiment.

Some services use a special device to balance load between servers (typically web servers). The load balancer may be relatively smart, and may be able to, e.g., direct the same HTTP session to the same server even if several TCP/IP connections are made. The load balancer is visible to the network using just one IP address, and connects to several servers behind it using their own IP addresses (though they could also be connected to distinct ports on the load balancer).

An SSH client (1111) connects through a network (1112) to a load balancer (1113) which directs (e.g., using NAT) to an SSH server (1114, 1115, 1116) behind it. Since the servers all look like a single server to the client, they should have the same host key (or alternatively, the client should be configured to accept any of their host keys as the host key for the load balancer's IP address and/or host name).

Figure 11C:
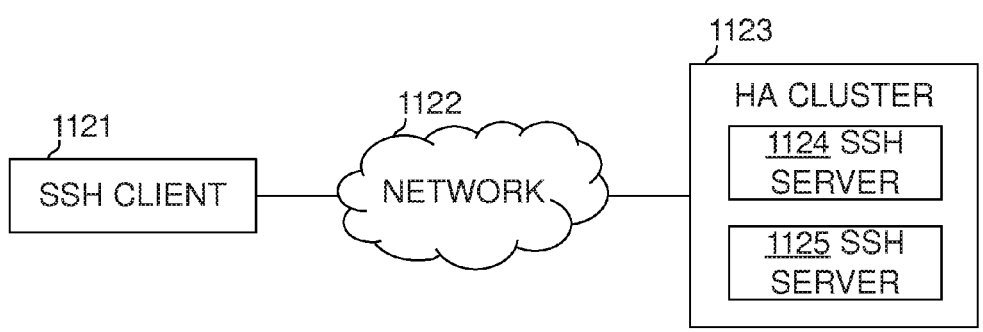
FIG. 11C illustrates a cluster of computers in a high-availability configuration that looks like a single computer to other computers in an embodiment.

FIG. 11C illustrates a cluster of computers in a high-availability configuration that looks like a single computer to other computers in an embodiment. An SSH client (1121) connects through a network (1122) to a high-availability cluster (1123) that comprises two or more nodes each having an SSH server (1124, 1125). Typically one of the nodes in the cluster would be active and another would be stand-by. If the active node fails, the other node will activate. Special synchronization protocols are usually used to synchronize data on the nodes during normal operation. Since they may switch over at any time, both nodes should have the same host key, or the client should be configured to accept each of their host keys for the IP address.

Figure 12:
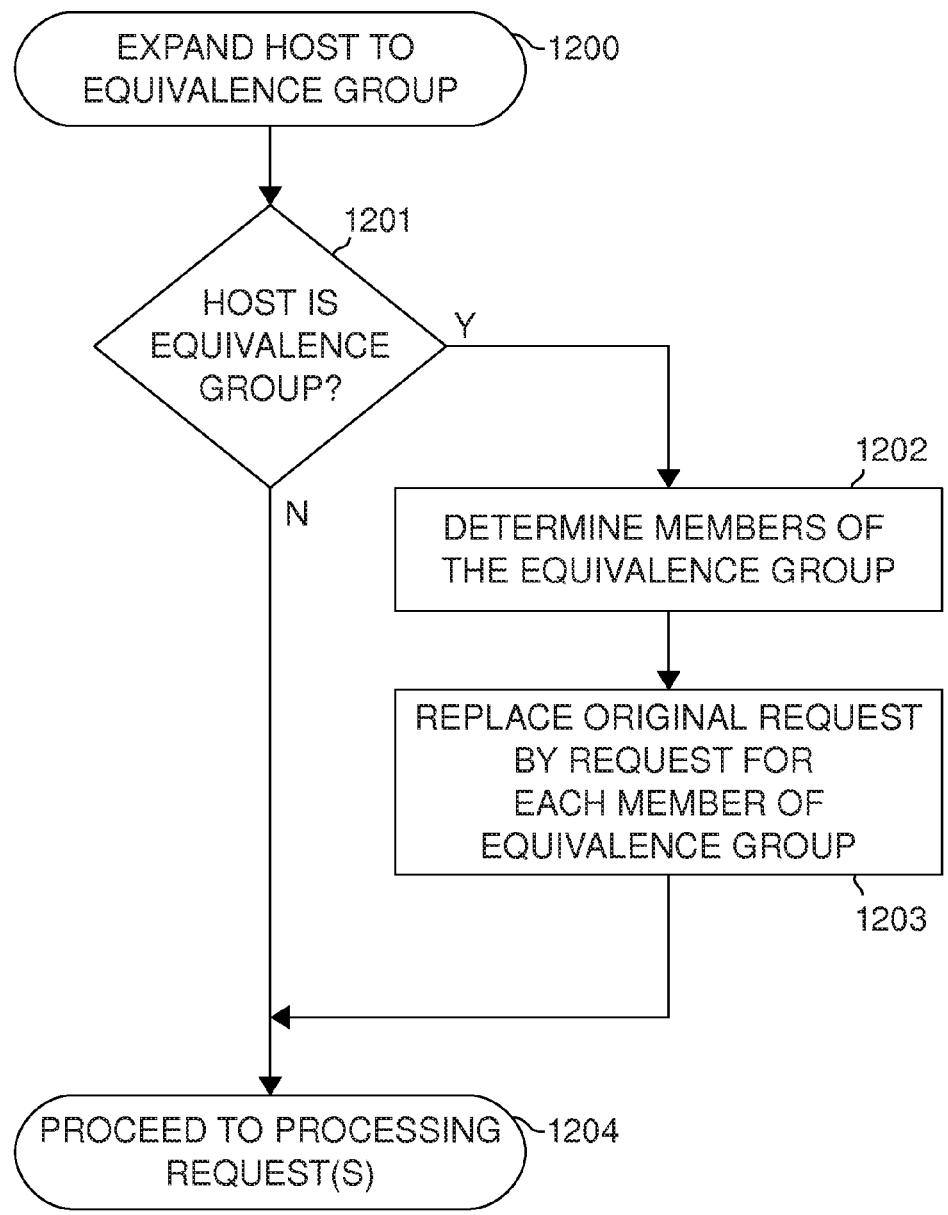
FIG. 12 illustrates expanding a host to an equivalence group representing a cluster of computers in an embodiment.

FIG. 12 illustrates expanding a host to an equivalence group representing a cluster of computers in an embodiment.

A host equivalence group is a group of hosts that should either have the same host key or that share a name and/or IP address (in a cluster configuration), and clients should be configured to accept any of their host keys for the shared name and/or IP address. Generally, also an authorization to connect to/from one of the hosts in the equivalence group should mean an authorization to connect to/from any of the hosts in the equivalence group. Host equivalence groups may arise in each of the situations described in FIGS. 11A, 11B, and 11C. They also arise in various other high availability, hot stand-by, and disaster recovery configurations.

To expand a host name to an equivalence group (1200), it is first checked if the host belongs to a host equivalence group (1201) (e.g., by reading information for the host from a database, and checking an "equivalence group" field in the host information record). If it does not belong to a host equivalence group, nothing special can be done and any request using the host can be processed normally (1204). If the host belongs to an equivalence group, the members of the equivalence group are determined (1202) (e.g., by making a query to the database searching for all host records with the "equivalence group" field set to the desired group), and the original request is replaced by a request for each member of the equivalence group (1203) (advantageously, replaced here means that a sub-request is created for each member host, and the original request just waits for the sub-requests to complete; the sub-requests may be marked as to no longer require equivalence group expansion, to prevent infinite repeated expansions, as also the members all refer to the equivalence group). After expansion, each resulting request is processed normally (1204).

Figure 13:
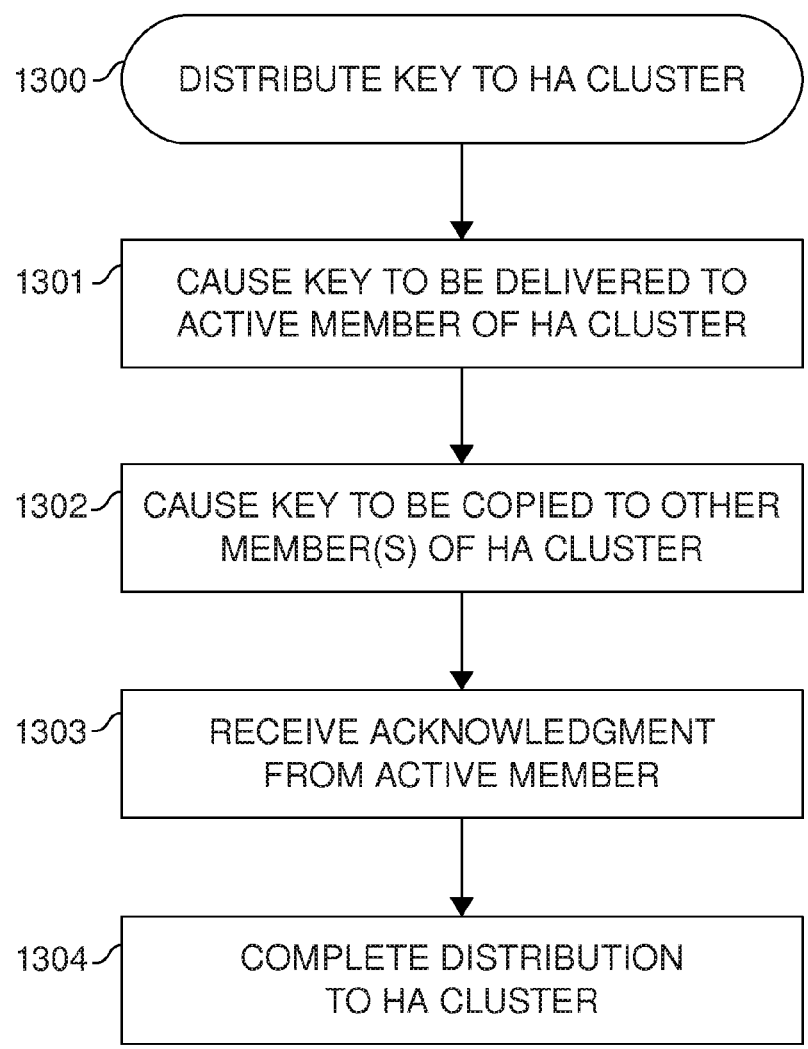
FIG. 13 illustrates distributing a key to a high availability cluster in an embodiment.

FIG. 13 illustrates distributing a key to a high-availability cluster (1300) in an embodiment. The key is delivered to one member of the high-availability cluster (1301), it is copied to the other member(s) of the cluster (1302), acknowledgment is received from the active member (1303), and the distribution is signaled complete (1304) and/or related actions performed.

Figure 14:
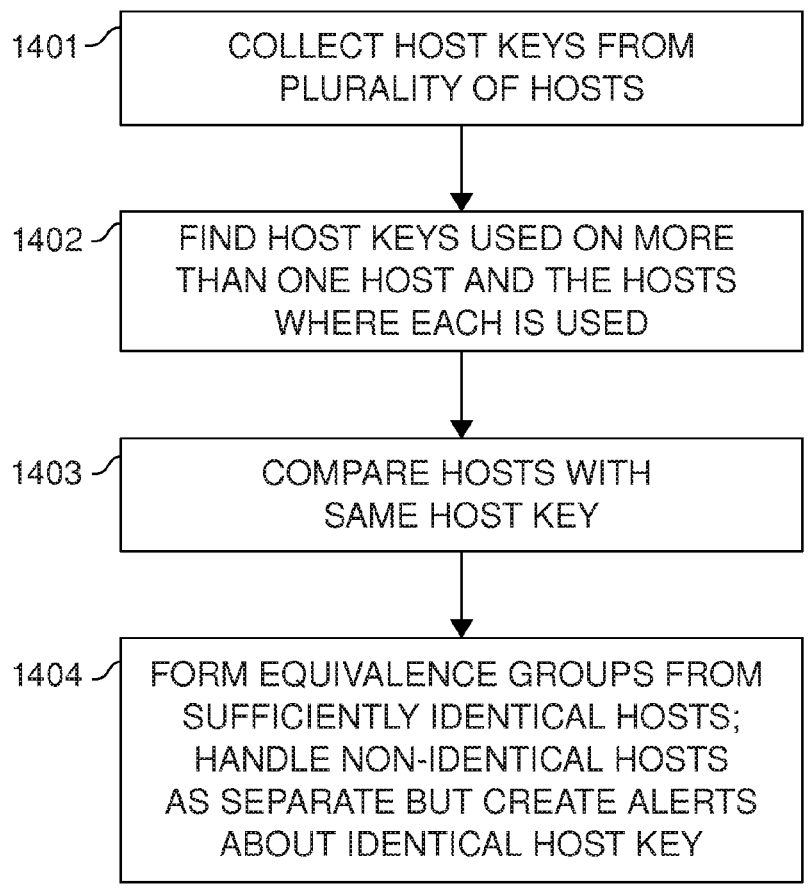
FIG. 14 illustrates automatically detecting equivalence groups for clusters of computers using existing host key information in an embodiment.

FIG. 14 illustrates automatically detecting host equivalence groups for clusters of computers using existing host key information in an embodiment. Host keys are collected from a plurality of hosts (1401), host keys used on more than one host are identified and for each key it is determined where it is used (1402), the hosts having the same host key are compared to determine if they are likely to be in the same cluster (1403), and host equivalence groups are formed from sufficiently identical hosts (1404). Hosts that have the same host key are handled as non-identical, but an alert is triggered about them having an identical host key. When comparing hosts, factors determining whether they are sufficiently identical may include whether they have the same user data sources with the same filters (have the same non-local users), have the same users (including local users), mount the same network file systems, have the same operating system and version, have the same patches installed, and/or have the same software packages installed.

Figure 15:
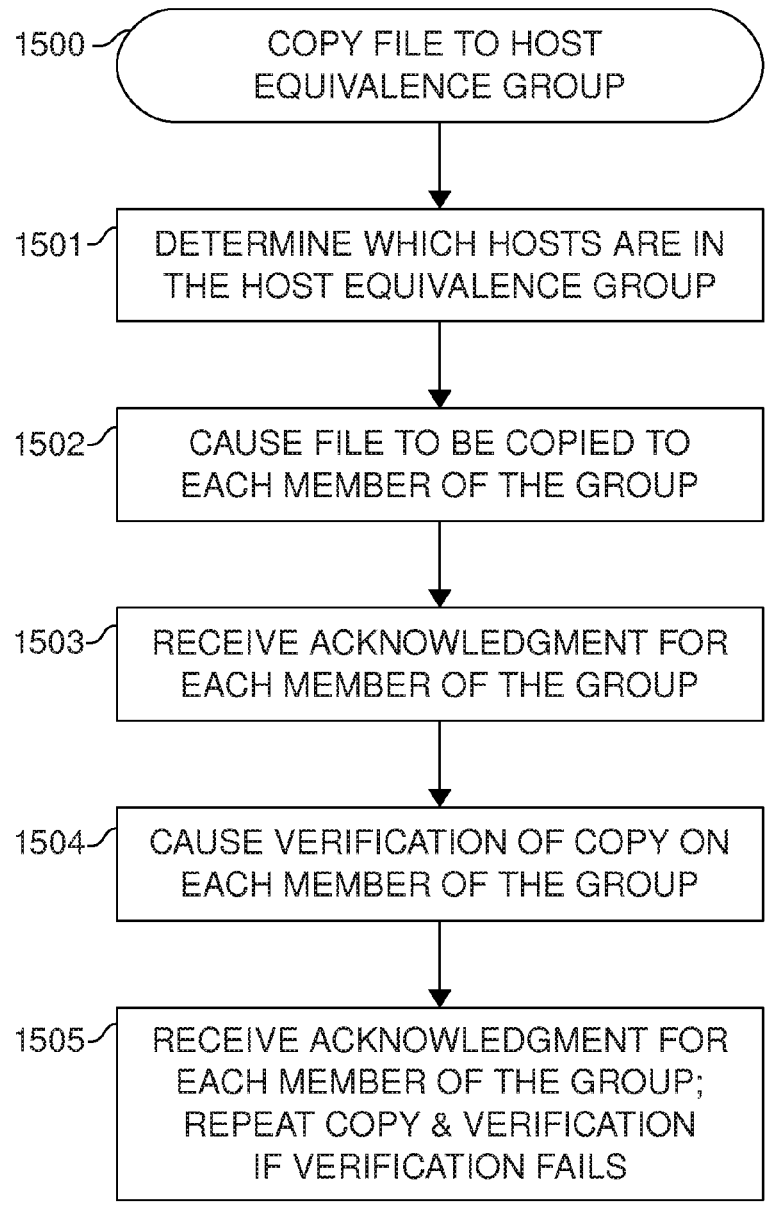
FIG. 15 illustrates copying a file to all hosts in a host equivalence group in an embodiment. Modification of a file on all hosts in a host equivalence group can be performed analogously.

FIG. 15 illustrates copying a file to all hosts in a host equivalence group (1500) in an embodiment. Modification of a file on all hosts in a host equivalence group can be performed analogously. It is determined which hosts are in the host equivalence group (1501), copying the file to each member of the group is caused (1502) (e.g., by creating a sub-request to copy it), acknowledgment is received for each member of the group (1503), verification of copy on each member is caused (1504) (e.g., by creating sub-requests for verifying; verifying could mean comparing a cryptographic hash computed from the file), receiving acknowledgments that the verifications have completed, and completing the overall request to copy if all verifications were successful, and re-copying and re-verifying at least those copies where verification failed (1505). The verification part could equivalently be integrated into the copying request, both being performed before signaling completion of the sub-request.

Figure 16:
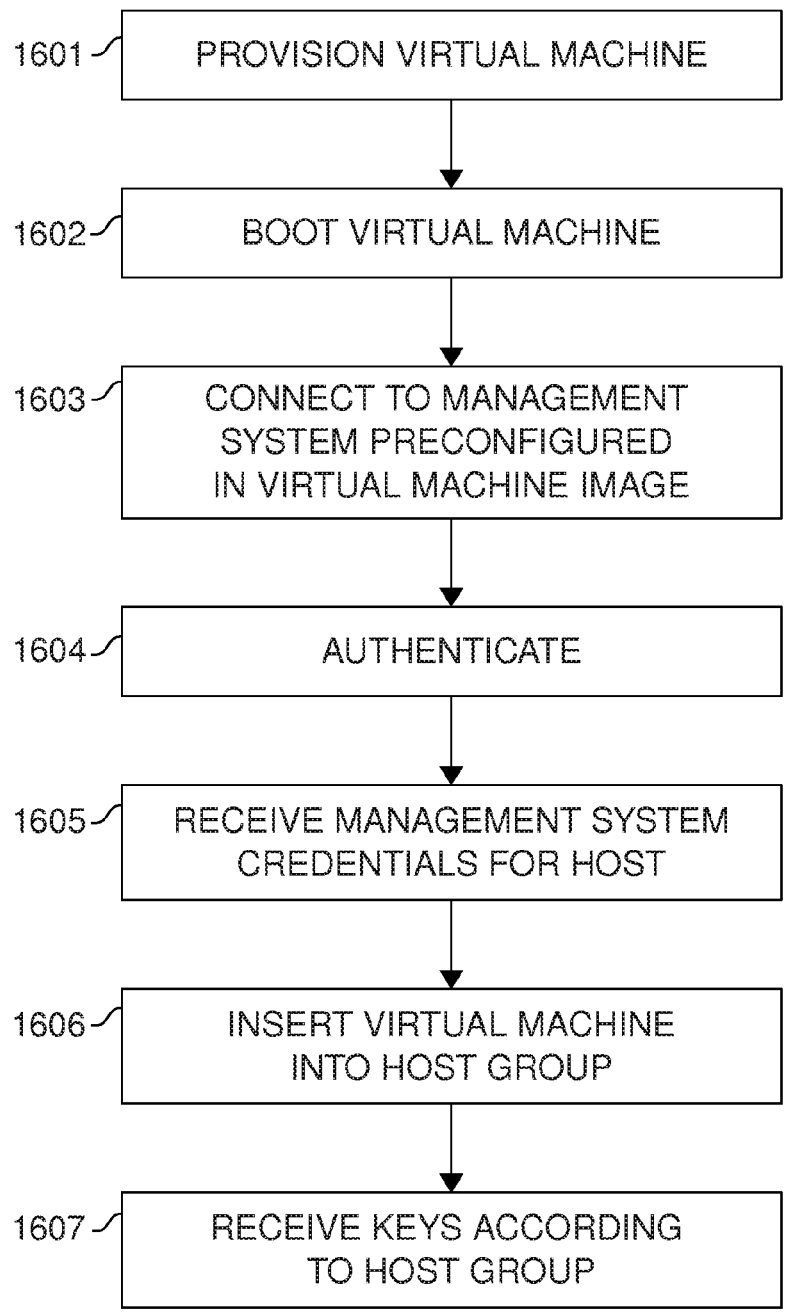
FIG. 16 illustrates provisioning a new virtual machine and enrolling it in a management system in an embodiment where management system information is preconfigured in the virtual machine image.

FIG. 16 illustrates provisioning a new virtual machine and enrolling it in a management system in an embodiment where management system information is preconfigured in the virtual machine image. The virtual machine is provisioned (1601), the virtual machine is booted (1602), the virtual machine connects to the management system (1603) using management system address and authentication information (e.g., public key for the management system), and the virtual machine authenticates with the management system (1604) (e.g., verifying that the management system possesses the private key for the management system, and/or the management system verifies that the connecting virtual machine knows a shared secret, in this case the public key). Then the virtual machine receives credentials for itself from the management system (1605) (the credentials allowing it to authenticate itself to the management system and vice versa; the credentials may be, e.g., a shared secret or a public key for the management system and a private key for the virtual machine). The virtual machine inserts itself into a host group on the management system, the group specified in the virtual machine image or based on installed software (1606), and the virtual machine receives keys from the management system (1607) based on its host group. The keys may include host keys for other machines in the environment. They may also include public user keys that authorize certain accounts on other machines to log into the virtual machine using public key authentication. They may also include private keys that authorize the new virtual machine to log into certain other machines.

Figure 17:
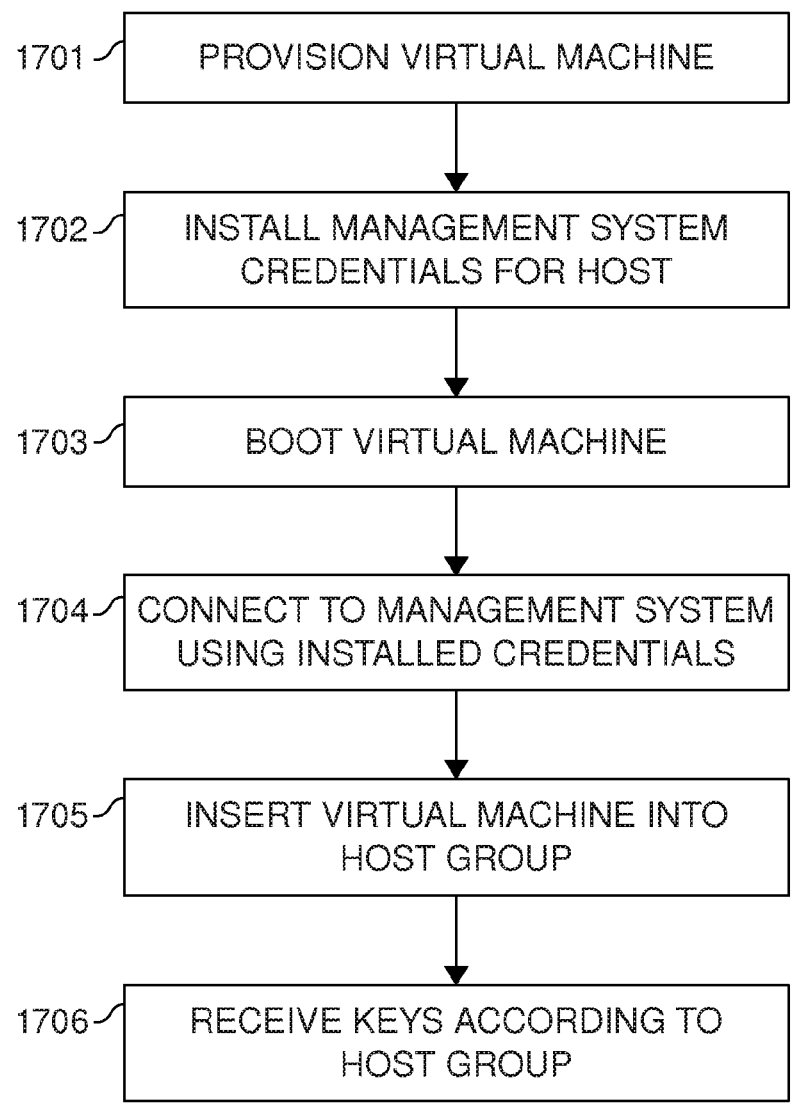
FIG. 17 illustrates provisioning a new virtual machine and enrolling it in a management system in an embodiment where management system is installed on the new virtual machine before booting it or during early stages of its boot/self-configuration process.

FIG. 17 illustrates provisioning a new virtual machine and enrolling it in a management system in an embodiment where the management system is installed on the new virtual machine before booting it or during the early stages of its boot/self-configuration process. The virtual machine is provisioned (1701), management system credentials are installed on the host (1702) (e.g., they are obtained from the management system by the provisioning system, and inserted into the virtual machine before booting it), the virtual machine is booted (1703), the virtual machine connects to the management system using the installed credentials (1704), the virtual machine is inserted into a host group (1705) (though this could also be performed, e.g., by the provisioning system), and the virtual machine receives keys based on its host group (1706).

Figure 18:
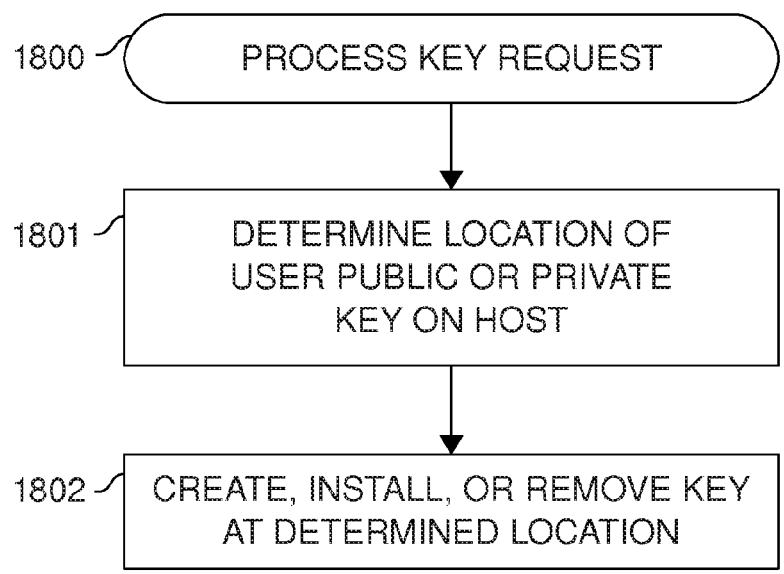
FIG. 18 illustrates processing a key request in an embodiment, taking into account that keys may be stored in non-standard locations as specified in configuration files.

FIG. 18 illustrates processing a key request (1800) in an embodiment, taking into account that keys may be stored in non-standard locations as specified in configuration files. A key request may be, e.g., a request to add or remove a public or private key for an account on a host. The location of the user's public or private keys (as the case may be) is determined (1801) (e.g., by reading and parsing an SSH configuration file on/from the host, reading the location from the management system's database where it has been stored previously, e.g., during key discovery, or reading host group specific settings from the management system's database) and the key is created, installed, or removed (as the case may be) at the determined location (1802).

Figure 19:
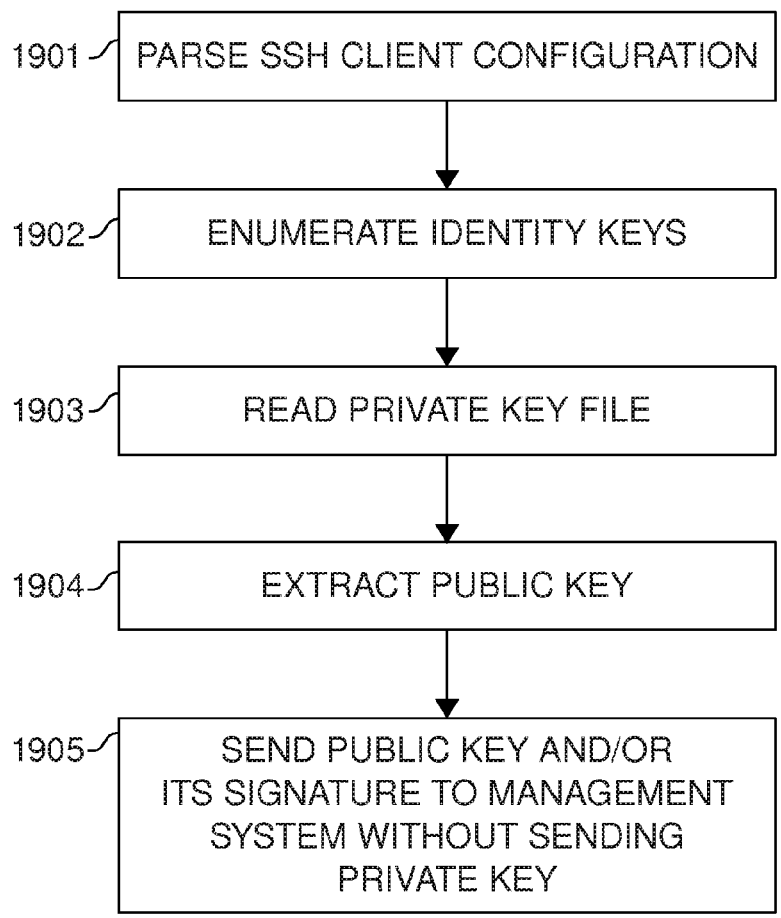
FIG. 19 illustrates processing on a managed host for obtaining the public keys or fingerprints corresponding to private keys used by a user for authentication in an embodiment.

FIG. 19 illustrates processing on a managed host for obtaining the public keys or fingerprints corresponding to private keys used by a user for authentication in an embodiment. The user's SSH client configuration file (and the server-wide SSH configuration file) is parsed (1901), identity keys are enumerated (1902) (e.g., by extracting IdKey specifications from the configuration file, or enumerating all private key files from a directory determined from the configuration file and default values), a private key file (possibly several) is read (1903), a public key is extracted for the private key (1904) (e.g., by reading the corresponding public key file or by computing the public key from the private key), and the public key and/or its fingerprint is sent to the management system without sending the private key (1905).

Figure 20:
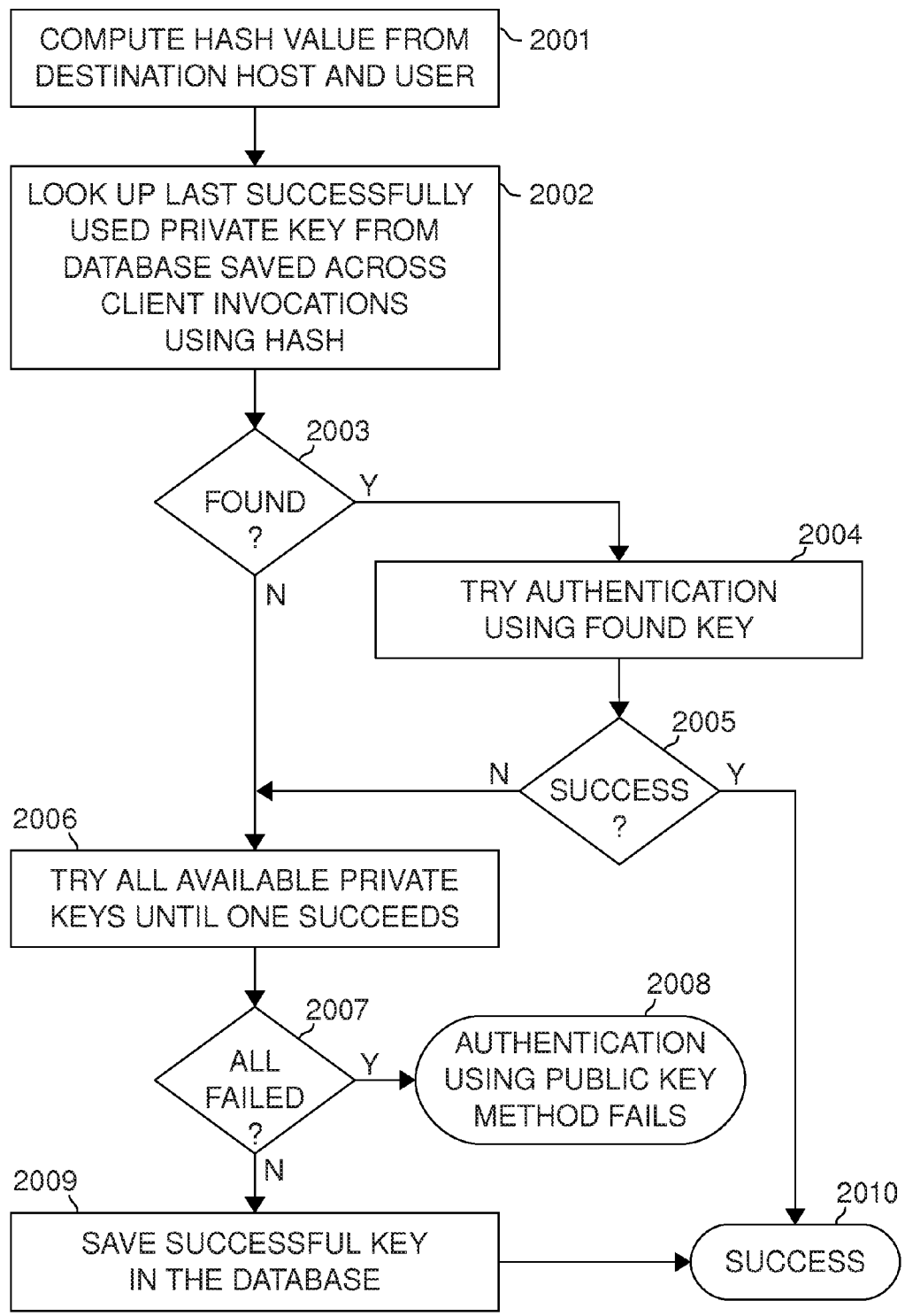
FIG. 20 illustrates speeding up logins in the presence of many private keys for authentication in an SSH client in an embodiment.

FIG. 20 illustrates speeding up logins in the presence of many private keys for authentication in an SSH client in an embodiment when authenticating to an SSH server. A hash value is computed from a destination host and user (2001). The last successfully used private key is looked up from a database saved across client invocations using the hash (2002) (generally, using the hash here is optional, and with some databases the same could equivalently be achieved using the host and user directly as keys in a query). It is tested whether such a key was found (2003), and if so, authentication to the server is attempted using the found key (2004). If successful (2005), authentication succeeds (2010). If no key was found or authentication failed, then all available private keys are tried until one succeeds or there are no more keys (2006), if they all failed (2007), authentication using public key fails (2008), and if one succeeds, the successful key is saved in the database (2009) and public key authentication succeeds (2010).

Figure 21:
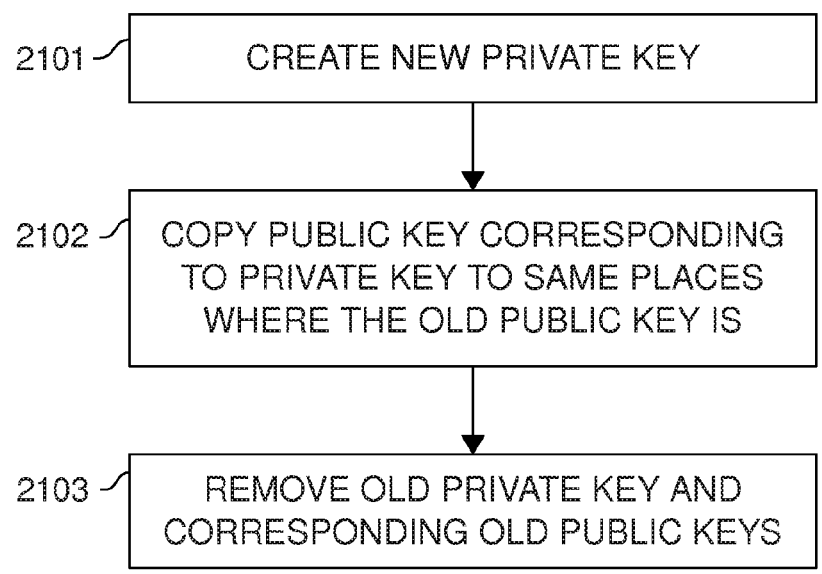
FIG. 21 illustrates renewing a key pair used for public key authentication in an embodiment.

FIG. 21 illustrates renewing a key pair used for public key authentication in an embodiment. First, a new private key is created (2101) (e.g., by causing ssh-keygen to be run on the host where the private key should be stored, and adding it as an identity key in an applicable configuration file, if needed), the public key corresponding to the private key is copied to the same places where the old public key from the key pair being renewed is stored (2102) (possibly being first copied to the management system, and then copied using subrequests to the key renewal requests during the applicable maintenance windows), and finally the old private key and corresponding old public keys are removed (2103). It is possible to optimize the process by removing the old public keys as soon as the new public key has been installed on a host (possibly using the same request), but the old private key cannot be removed until the new public key has been installed on all relevant hosts.

Figure 22:
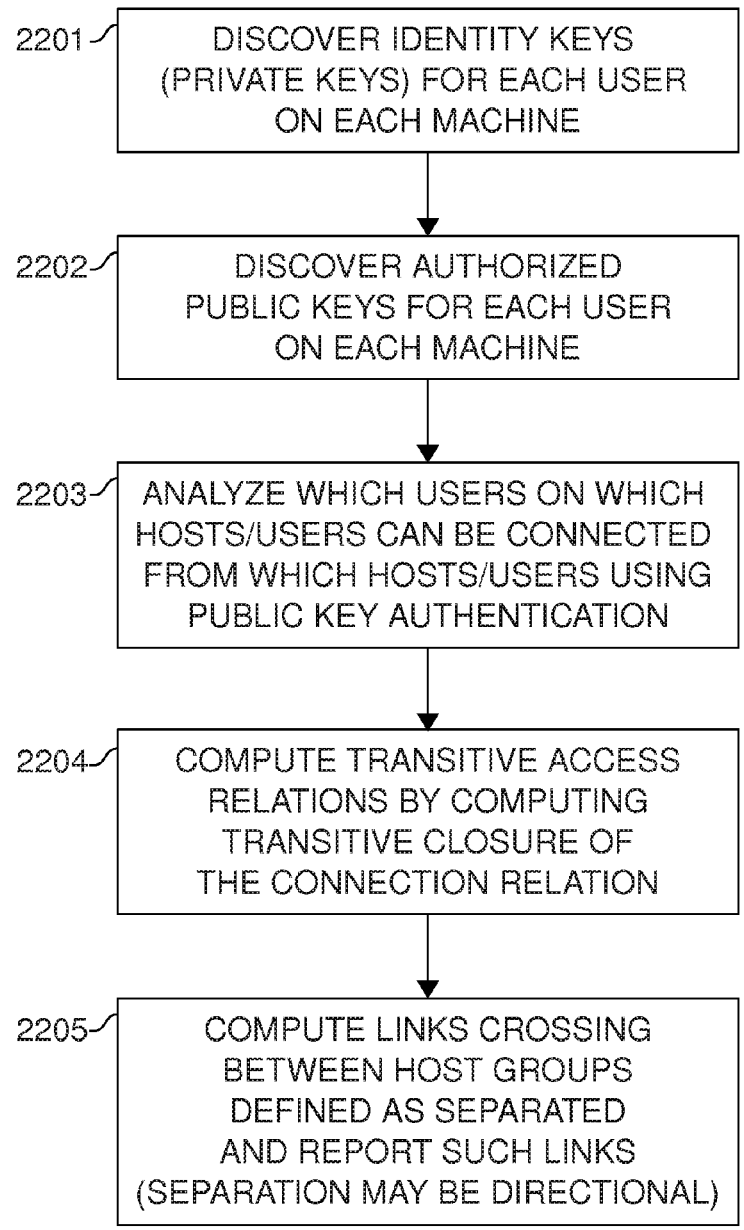
FIG. 22 illustrates discovering public and private keys from hosts and accounts in a managed environment and analyzing the keys to discover authorized connections between accounts in an embodiment.

FIG. 22 illustrates discovering public and private keys from hosts and accounts in a managed environment and analyzing the keys to discover authorized connections between accounts in an embodiment.

Identity keys (private keys) are discovered for a plurality of users on a plurality of hosts (2201) and authorized public keys are discovered for a plurality of users on a plurality of hosts (2202), it is analyzed which users on which hosts can connect to which users at which hosts using public key authentication (2203), transitive closure of the access relations is computed (2204) to determine what accounts can be reached from a particular account by following transitive access relations (this step is optional), and links crossing between host groups specified as separated are reported (2205) as such "red" or "suspicious" links (group separation may be directional, i.e., links in one direction may be ok and links in another direction may not be ok) (this step is optional).

In one embodiment, the keys are spontaneously and regularly reported by a management agent running on a managed host. In another embodiment, the management system regularly connects a managed host, causing it to report any changes in keys (or existing keys on the first connection). In yet another embodiment, the management system generates a request to extract the keys from a managed host (e.g., using a proxy agent to implement agentless management). In one embodiment, full information is regularly sent from a host to the management system, and the management system compares it with previously sent information to detect changes.

In one embodiment, the connections are analyzed as follows: iterate over all accounts; for each, iterate over all private keys of the account; for each, iterate over all accounts; for each, iterate over all public keys of the account; if the public key matches the private key, record connection. Instead of the private keys, public keys or fingerprints derived from them may be used in the comparison. This can be optimized by iterating over private keys and using hash tables to find the matching public keys (instead of hash tables, e.g., database indexes may also be used).

Figure 23:
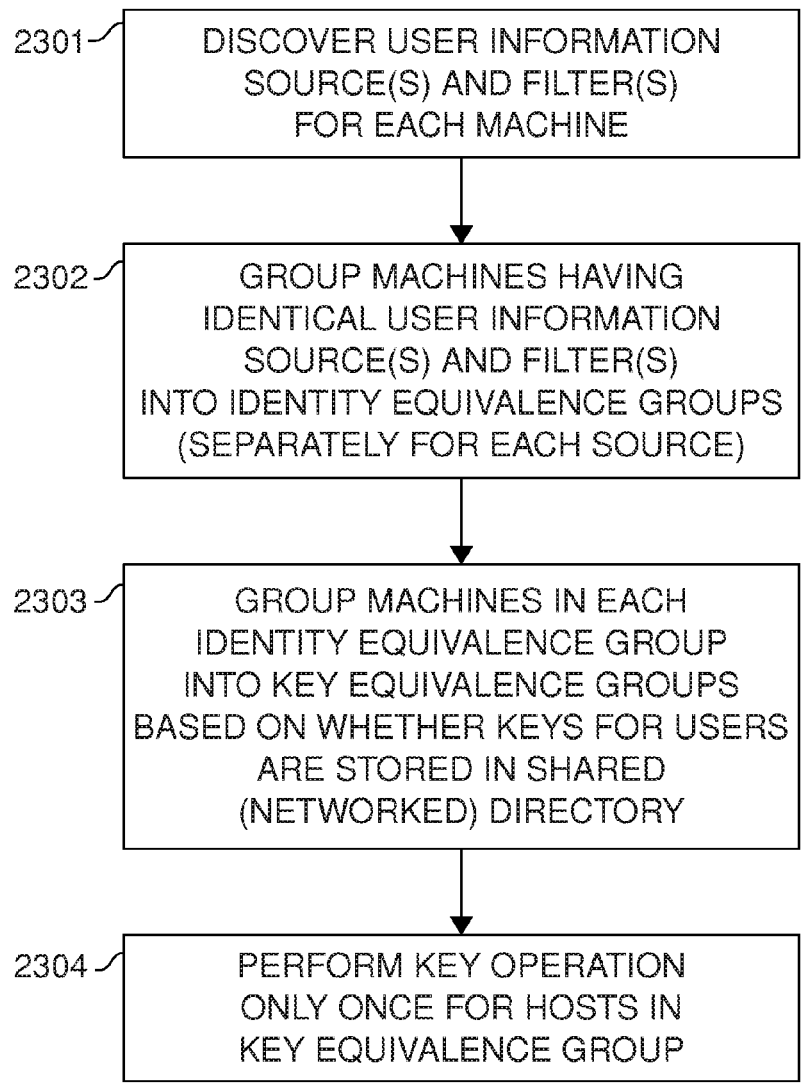
FIG. 23 illustrates grouping machines into identity equivalence groups and key equivalence groups based on discovered information about user information sources in an embodiment.

FIG. 23 illustrates grouping machines into identity equivalence groups and key equivalence groups based on discovered information about user information sources in an embodiment. First information about user information source(s) and filter(s) (e.g., LDAP or Active Directory configuration) is discovered for a plurality of computers using agent-based or agentless discovery (2301). Identity equivalence groups are then formed from computers having identical user information source(s) and filter(s) (2302). Computers in each identity equivalence group are then grouped into key equivalence groups based on whether keys for users in the source(s) (as filtered by the filter(s)) are stored in the same (networked, or shared) directory on each computer (2303). (Clearly, the two grouping steps can equivalently be combined into a single step that applies both criteria simultaneously.)

In this embodiment, to be in the same key equivalence group the computers must have identical user information source(s) and filter(s), and users obtained from the user information source(s) according to the filter(s) must have the same (shared) home directory on both machines or keys are otherwise stored in the same directory for them. The keys do not necessarily need to reside in a user's home directory, as SSH configuration can specify that they be stored in a system directory—in that case the relevant question would be whether that system directory is the same (e.g., networked, shared) directory on both machines. Shared directories are also common in virtualization environments (especially paravirtualized environments where parts of the kernel are shared by multiple instances). The exact definition of when computers can be grouped into the same key equivalence group may vary in different embodiments.

When two computers are in the same key equivalence group, it is sufficient to install a key on just one of the computers and it will be automatically visible on the other computers in the key equivalence group. In (2304) a key operation (e.g., adding, removing, or renewing a public key or creating a private key) is performed on just one of the computers in a key equivalence group as opposed to performing the operation on each computer in the group. In one embodiment the operation is performed on a computer that is not a member of the key equivalence group but has access to a directory on which the keys for computers in the group are stored (e.g., is the file server providing the directory, or a computer mounting the directory).

Key equivalence groups can be formed with respect to host keys (host key equivalence groups), user keys (user key equivalence groups), or both. Computers in a host key equivalence group need not necessarily have the same user information source(s) and filter(s), whereas computers in the same user key equivalence group usually do.

In one embodiment only some user information sources are taken into account in the grouping. For example, LDAP or Active Directory sources may be taken into account while local user accounts (e.g., /etc/passwd file on Unix) is not taken into account in the grouping. In one such embodiment a host can be in a key equivalence group with respect to a certain set of users (such as those coming from Active Directory) and not with respect to another set of users (e.g., those coming from a local file).

Figure 24:
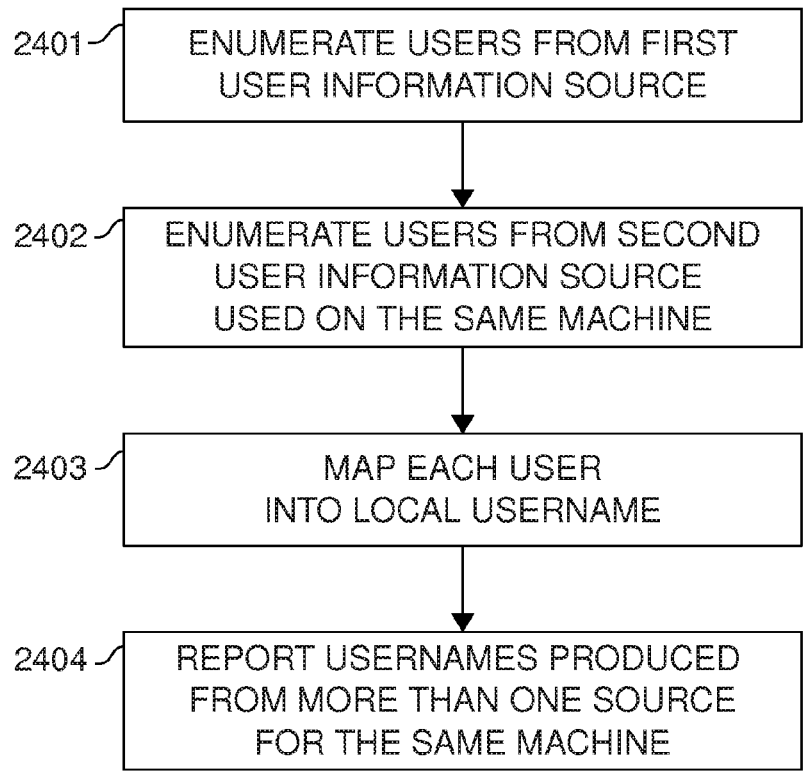
FIG. 24 illustrates detecting user accounts defined in more than one user information source in an embodiment.

FIG. 24 illustrates detecting user accounts defined in more than one user information source in an embodiment. User accounts are enumerated from a first user information source (2401) and a second user information source (2402) (that are in one embodiment restricted to both be in use on the same machine), each user is mapped into a local user name (or numerical user identifier, such as Unix/linux "uid") (2403), and user names (or identifiers) that result from more than one source (for the same machine in one embodiment) are reported (2404). Such reports can be useful for checking the consistency of user databases and ensuring that no user account is multiply defined so that processes for removing user accounts work reliably. It can detect both configuration errors and user errors, and is particularly important in situations like mergers and IT consolidation where IT infrastructures from more than one previously independently managed organization are taken under common management.

Figure 25:
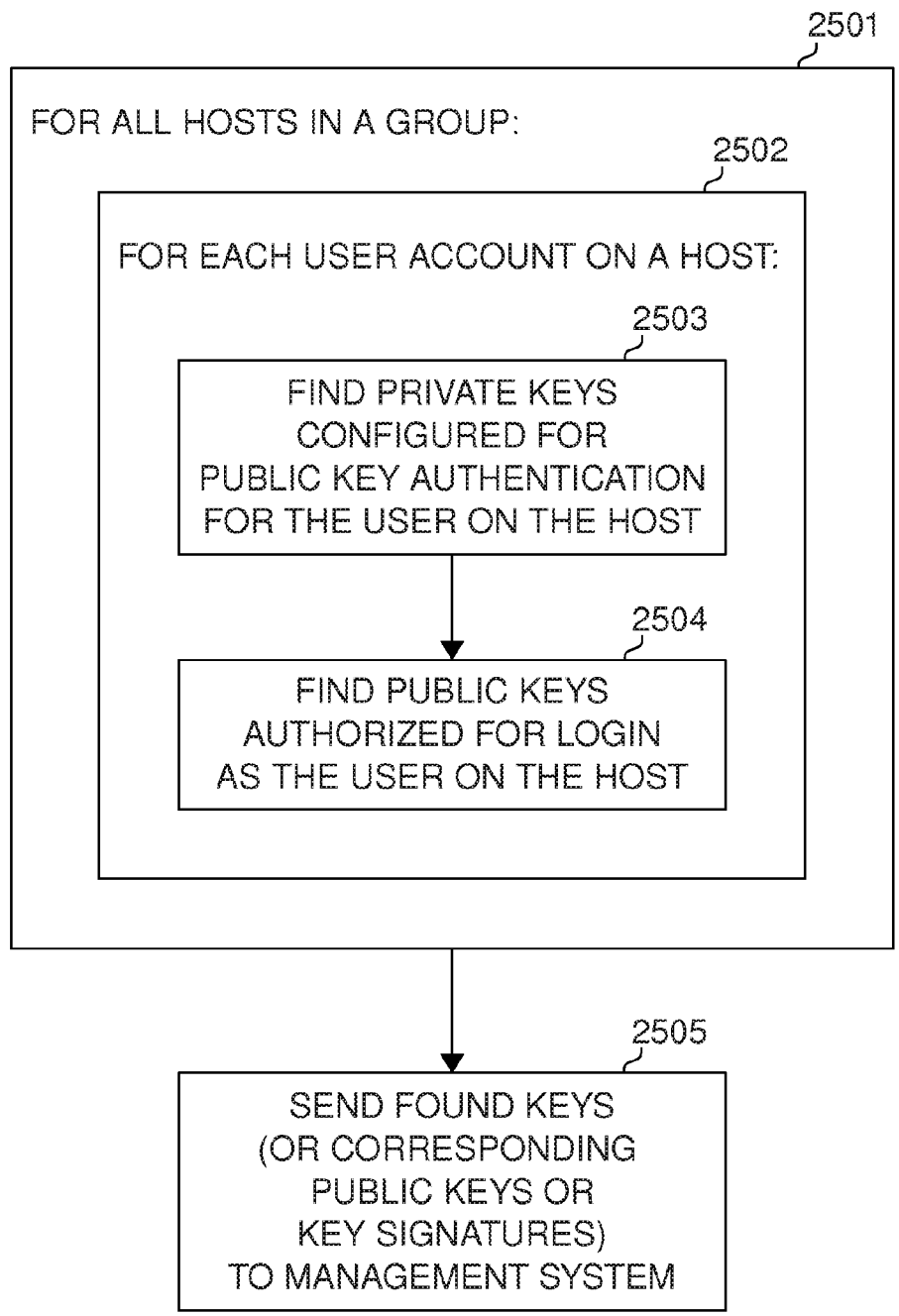
FIG. 25 illustrates the private and public key discovery process in a managed environment having a group of managed hosts in an embodiment.

FIG. 25 illustrates the private and public key discovery process in a managed environment for a group of managed hosts in an embodiment. For each host in the group (2501) and for each user on each host (2502), find private keys configured for public key authentication for the user on the host (2503) and find public keys authorizing logins as the user on the host (2504). Then send the found keys (and in an embodiment, related additional information, such as a command configured to be executed when the key is used for logging in, or permitted source IP addresses for connection using the key) are sent to a management system (2505). The sending may be performed separately for each user or information for multiple users and/or may be sent at a time. In one embodiment an intermediate host collects information for more than one user or host, and then sends the collected information to the management system.

In one embodiment, the OpenSSH /etc/ssh/sshd config configuration file is read on the host (using, e.g., the SSH protocol to access the host and the SFTP protocol or something equivalent to a Unix "cat" command to read files), and the AuthorizedKeysFile configuration option is parsed from the file, and the file indicated by that option is then parsed to obtain authorized public keys, which are then sent to the management system. In one embodiment $HOME/.ssh/authorized keys is used as the default file name if the option is not present in the configuration file ($HOME means user's home directory).

In one embodiment, principal names (for X.509 or equivalent certificate-based authentication) are obtained in addition to or instead of authorized public keys. The OpenSSH /etc/ssh/sshd config file is read on the server, and the AuthorizedPrincipalsFile configuration option is parsed from the file, and the file indicated by that option is then parsed to obtain a list of authorized principal names, which are then sent to the management system. In one embodiment the TrustedUserCAKeys option is also parsed, and the corresponding certificates read and sent to the management system.

In one embodiment substantially all information from configured authorization keys files for one or more users on one or more of the hosts in the group is sent to the management system. In one embodiment the management system or a management agent running on a host parses the authorized keys file, and obtains keys, certificate authorities, authorized principal names and other information therefrom.

In one embodiment, the management system stores the configured certificate authorities in an SQL database, and provides a reporting facility for reporting which CA keys are authorized, the report being implemented using a query to the SQL database as is known in the art.

In one embodiment the management system collects information about where CA certificates are stored (in which files in which user's directories or in which system-wide directories on which hosts). In one embodiment the management system replaces one or more CA certificates on one or more managed hosts by one or more new CA certificates.

Certificates may be used with the SSH protocol (and some SSH client/server implementations) for both host keys and user keys. Since certificates are typically only valid for a certain amount of time, detecting expired certificates and renewing them regularly can advantageously also be performed by a management system.

In one embodiment a management system manages SSH host certificates. The management system reads the SSH server configuration file to locate configured host certificates (by fetching the configuration file or using an agent). The location of the keys and/or certificates and/or the certificates themselves and/or information extracted from them (such as expiration date and cryptographic parameters) is stored in the management system. It may also locate and send chains of higher-level certificates that are needed with some certificate authorities. The management system provides a means for renewing host certificates. In one embodiment the management system comprises a built-in CA that is used to automatically renew the certificates. In another embodiment the management system generates a certificate signing request (CSR), sends it to a CA, and obtains a certificate from the CA. In one embodiment the management system also generates a new private key for the host as needed.

In an embodiment a management system reads SSH client configuration from an SSH client by reading the client configuration file and parsing it to locate certificate authority certificates (CA certificates) that the client trusts for host certificates. The management system sends the location of such certificates and/or the certificates themselves and/or information extracted from them (such as CA and expiration date) to the management system. In one embodiment the management system regularly obtains new CA certificates from trusted certificate authorities and installs such new certificates on clients as trusted CA certificates. In one embodiment the management system configures a certificate revocation list on a client. In one embodiment the management system configures OCSP (Online Certificate Status Protocol) on the client. In one embodiment the management system removes expired and/or revoked CA certificates from the trusted CA certificates on the client.

In one embodiment a management system manages CA certificates that are trusted for user authentication. The management system reads the SSH server configuration (and/or certificate files) files to discover such keys and may update configuration files and certificate files to manage such certificates (analogously to what was described for CA certificates for host keys on an SSH client).

In one embodiment a management system manages private keys certificates used for user authentication. The management system reads the SSH client configuration files (and/or private key files) to discover such certificates and private keys, stores information about them in the management, and provides means for renewing such certificates in an automated or semi-automated fashion. The management of such certificates is analogous to managing host certificates on an SSH server.

Figure 26:
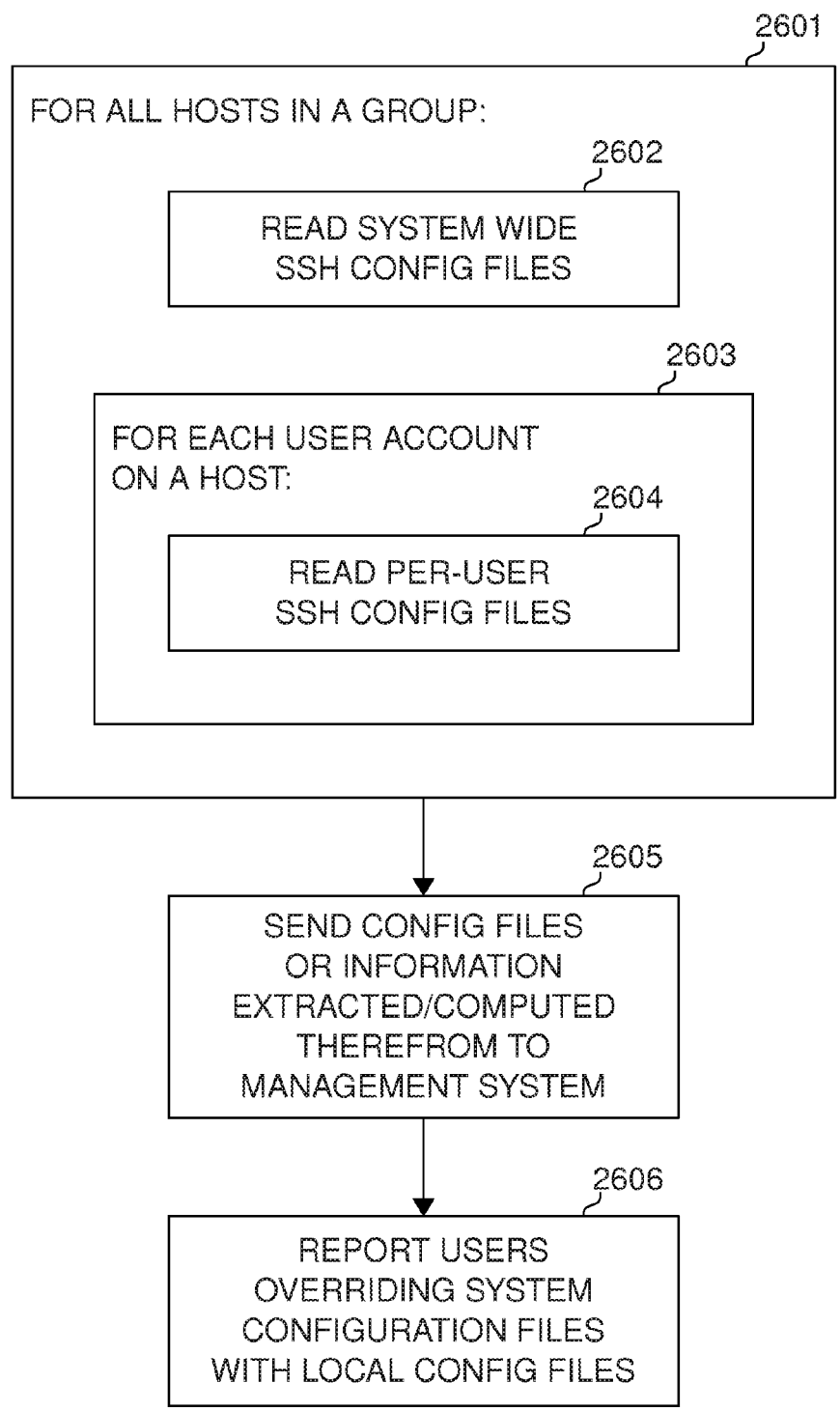
FIG. 26 illustrates discovering existing SSH configurations and reporting user-specific configuration files in an embodiment.

FIG. 26 illustrates discovering existing SSH configurations and reporting user-specific configuration files in an embodiment. For all hosts in a group of hosts (2601), system wide configuration files are read (2602) (using, e.g., SSH to access the machine and using the SFTP protocol or system commands to read files, such as those in /etc/ssh/sshd config and /etc/ssh/ssh config for OpenSSH), and for each user account on the host (2603), read per-user config files (2604) (such as .ssh/config in the user's home directory). The configuration files and/or information extracted or computed from them is then sent to a management system (2605) (this may happen separately for each user, or information may be aggregated for several users, possibly all users on a host, before sending, or a host may aggregate information from multiple users and then send the information to the management system).

In one embodiment, the management system provides a mechanism for reporting which users have per-user configuration files that override system configuration files (2606). In one embodiment the management system stores the information collected from hosts in an Oracle SQL database, with a field in each user record indicating whether the user has a configuration file that may override the system wide settings, and the report is generated by performing an SQL query against the database to find such users, and optionally further parsing their configuration file(s) and the system wide configuration file(s) to determine how the configurations differ.

Figure 27:
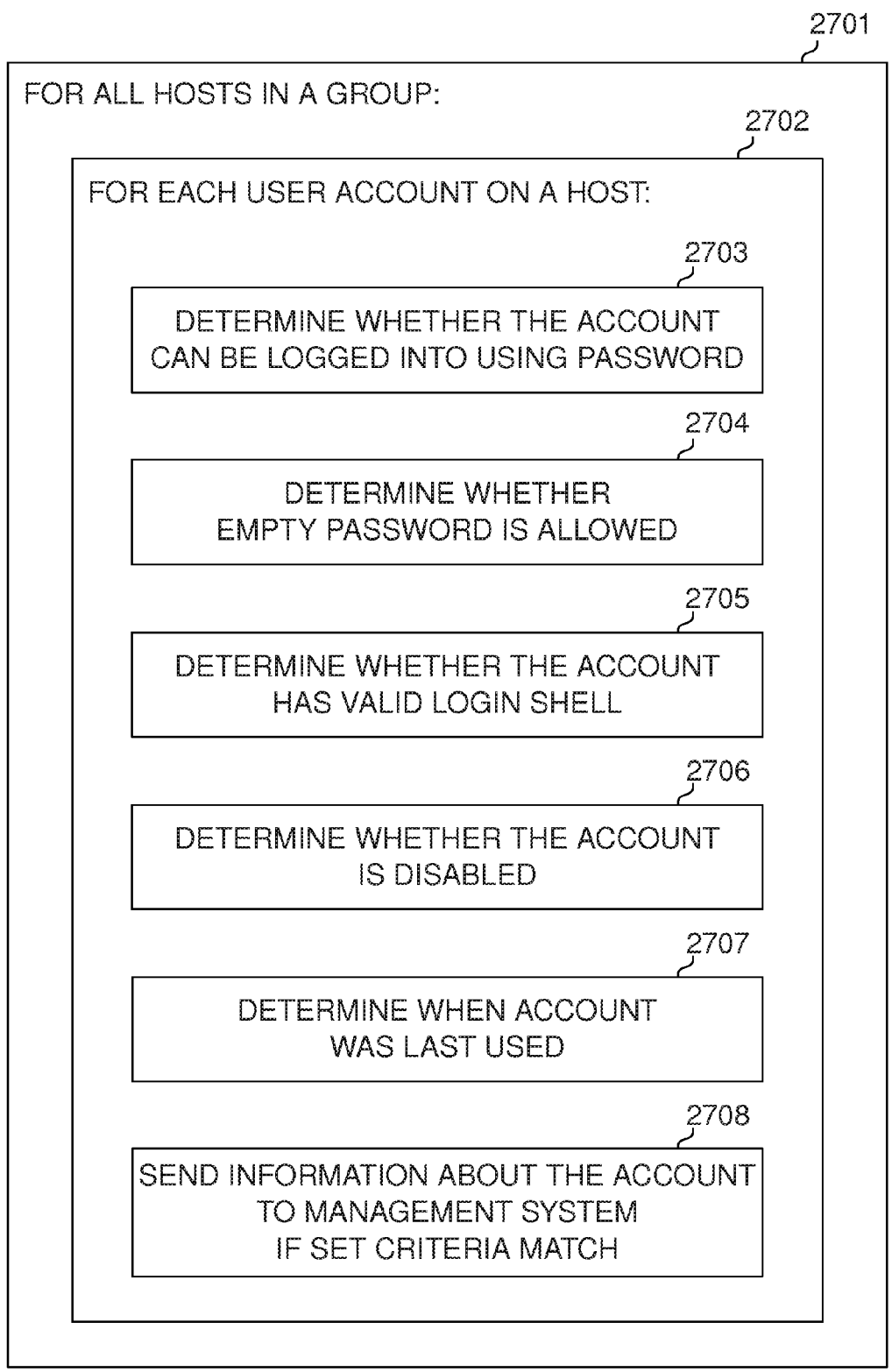
FIG. 27 illustrates discovering information about user accounts on a group of hosts in a managed environment in an embodiment.

FIG. 27 illustrates discovering information about user accounts on a group of hosts in a managed environment in an embodiment. For all hosts in the group (2701), information about user accounts on the host is discovered (by enumerating user accounts on the host, such as by calling getpwent( ) on Unix/Linux, or by querying them from LDAP on the host or on a management server and then sending the information to the host, optionally using a file or a database as an intermediate store) and for each user on each host (2702), multiple pieces of information is discovered.

It is determined whether the account can be logged into using password (2703). On many unix systems, for example, this is indicated by a special value in the password field; on other systems this may correspond to reading a field in a user record.

It is determined whether an empty password is allowed for the account (2704). This can be tested, e.g., by checking whether the password field (in, e.g., a local password file, LDAP, or Active Directory) is empty or by trying to authenticate as the user using an empty password.

It is determined whether the account has a valid login shell (2705). This can be checked by parsing the shell field in a password file (or directory record). On some systems this may correspond to checking a separate indicator of whether interactive logins or terminal sessions are permitted for the account.

It is determined whether the account is disabled (2706). This may be tested using fields in a user record in a local file or directory (e.g., LDAP, Active Directory), such as the value (especially the first character) of a password field or value in a separate field indicating whether the account is enabled or disabled (or active or non-active in alternate terminology).

It is determined when the account was last used (2707). On Windows this is often recorded in the user record in Active Directory; on many Unix/Linux systems this is recorded in a special file, such as /var/log/lastlog.

Additionally, information about the account is sent to the management system, at least if set criteria match (2708). The information may be sent using any suitable data format known in the art (such as XML over a TCP/IP connection, possibly protected by a security layer such as SSL). Information may be sent in one message or multiple messages per user, or may be combined for multiple users for sending to a management system.

Naturally, any of the steps may be omitted or they may be reordered, or additional steps may be included (such as checking whether the user has a home directory on the machine, whether such home directory is local or on a networked file system, and/or where such file system is mounted from). Sending information to a management system may be interleaved with the checks. Hosts and user accounts may be processed in any order, including several in parallel.

Figure 28:
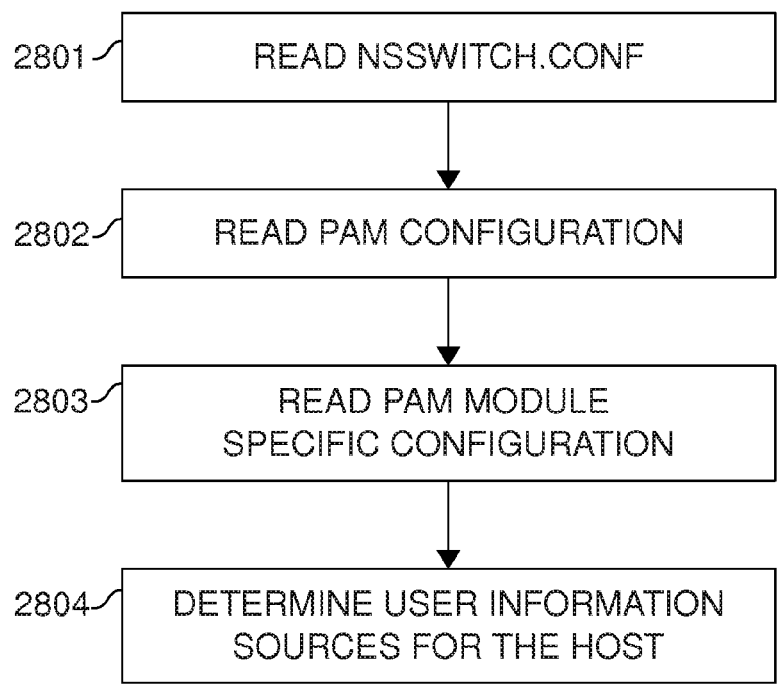
FIG. 28 illustrates extracting user information sources for a host in an embodiment.

FIG. 28 illustrates extracting user information sources for a host in an embodiment. The illustration is for a typical Unix/Linux system; the process for Windows can be found in Microsoft's developer documentation. The file /etc/nsswitch.conf is read (2801) to discover what system modules will be used for providing user (and other) information. PAM (Pluggable Authentication Module) global configuration file, typically /etc/pam.conf, is read (2802) and parsed. Application specific PAM module configurations are read from one or more files in /etc/pam.d (2803), especially the one for SSH, typically in /etc/pam.d/sshd.

The PAM configuration files may contain both recognized and unrecognized PAM modules. The management system allows providing customer-specific plugin modules for handling otherwise unrecognized PAM modules. Some of the PAM modules specify sources of user information. For example, "pam_unix.so" typically specifies using a local password file, "pam_ldap.so" specifies using an LDAP directory for password information, and "pam_winbind.so" provides authentication against the local Active Directory domain.

Some PAM modules have module-specific configuration files. For example, pam_ldap.so typically reads /etc/ldap.conf, which defines LDAP directories that may be used (by host names or IP addresses and optionally TCP/IP port number), and various information about such directories, such as the subtree that contains valid users. The configuration file also specifies the type of record that defines users, and which fields of the record are used for obtaining the local login name and user identifier for the user.

Generally, it is determined what user information sources are used on the host (2804). This information is a combination of information from nsswitch.conf, PAM configuration, and module-specific PAM configurations (possibly as interpreted by customer-specific plugins). Examples of information sources include "local password file", and "LDAP directory at a given address with certain client configuration parameters".

On Windows the steps basically involve reading Active Directory related configuration information.

Typically the information about the determined sources would be sent to a management system, and would be extracted for a group of managed hosts (all managed hosts in one embodiment). The exact steps vary among systems, and may be performed in a variety of orders.

Figure 29:
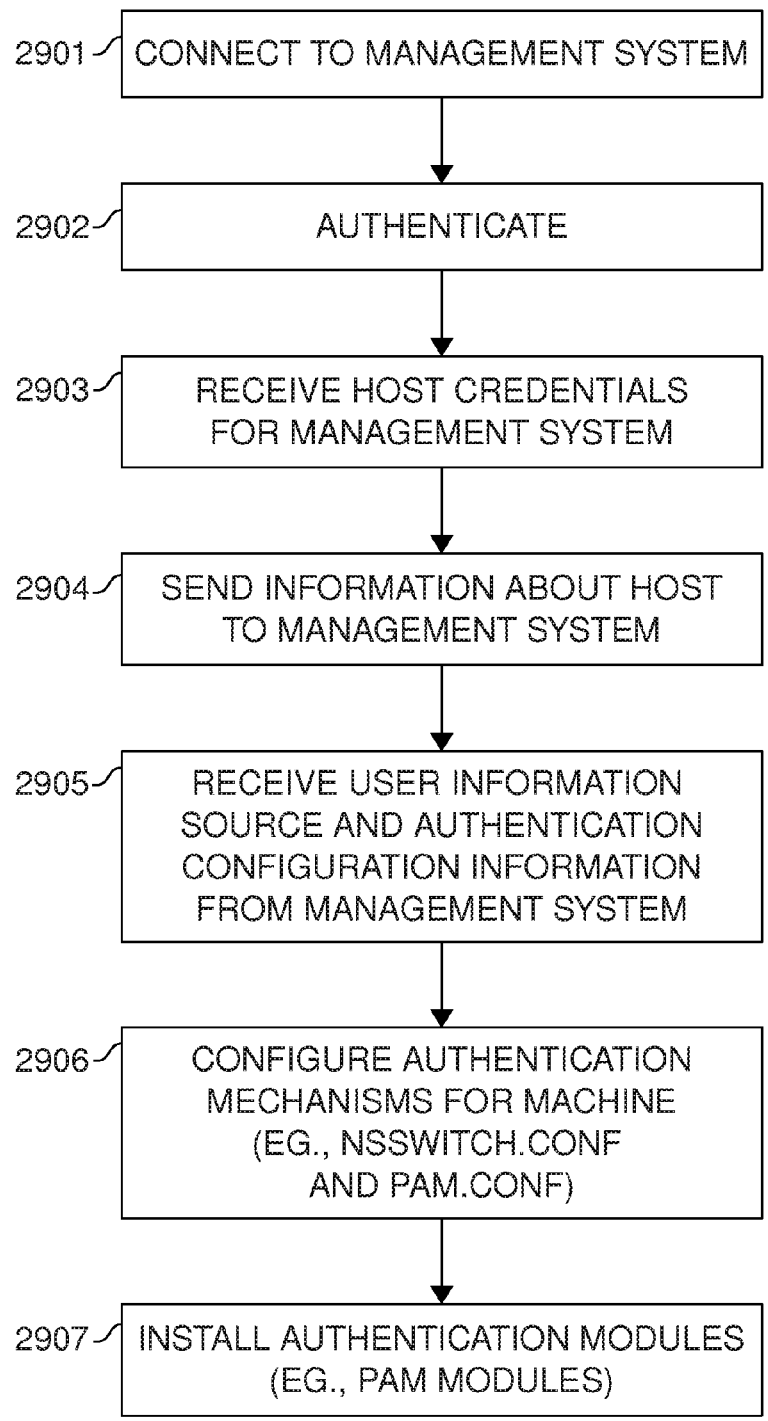
FIG. 29 illustrates configuring the authentication sources for a host using a management system in an embodiment.

FIG. 29 illustrates configuring the authentication sources for a host using a management system in an embodiment. First the host is connected with the management system (2901) (the connection may be initiated by the host or by the management system, depending on the embodiment and configuration; typically TCP/IP with some security protocol, such as SSL, SSH, or IPSEC would be used for the connection). The host is authenticated to the management system and/or the management system is authenticated to the host (2902) (either using host-specific credentials, or shared credentials that are used for initial installation of a host into the management system). Credentials for authenticating the host to the management system in the future are received (2903) (they may be generated by either the host or the management system and relevant information sent to the other side, thus the sending could be in either direction; advantageously public key credentials are used, with only the having the private key and only public key provided to the management system). Information about the host is sent to the management system (2904), advantageously including information about the host's operating system, hardware, and installed software. The management system uses the information for generating configuration information for the host. User information source information and other authentication configuration information is sent by the management system and received by the host (2905). Such information may be in the form of final configuration files that are installed in their appropriate locations, or may be in some generic format (e.g., XML) that is then converted to actual configuration files on the host. In the process, authentication mechanisms for the machine are configured (2906) (including, e.g., /etc/nsswitch.conf, /etc/pam.d/*, and /etc/pam.conf files). Required additional PAM modules, if any, are installed (2907). For example, if the organization uses a particular hardware token for authentication, a PAM module for implementing authentication using the module could be automatically installed.

Naturally some of the steps might be omitted; for example, if the host is already being managed by the management system, (2903-2904) might be omitted. If a connection with the management system already exists, (2901-2902) might be omitted.

Figure 30:
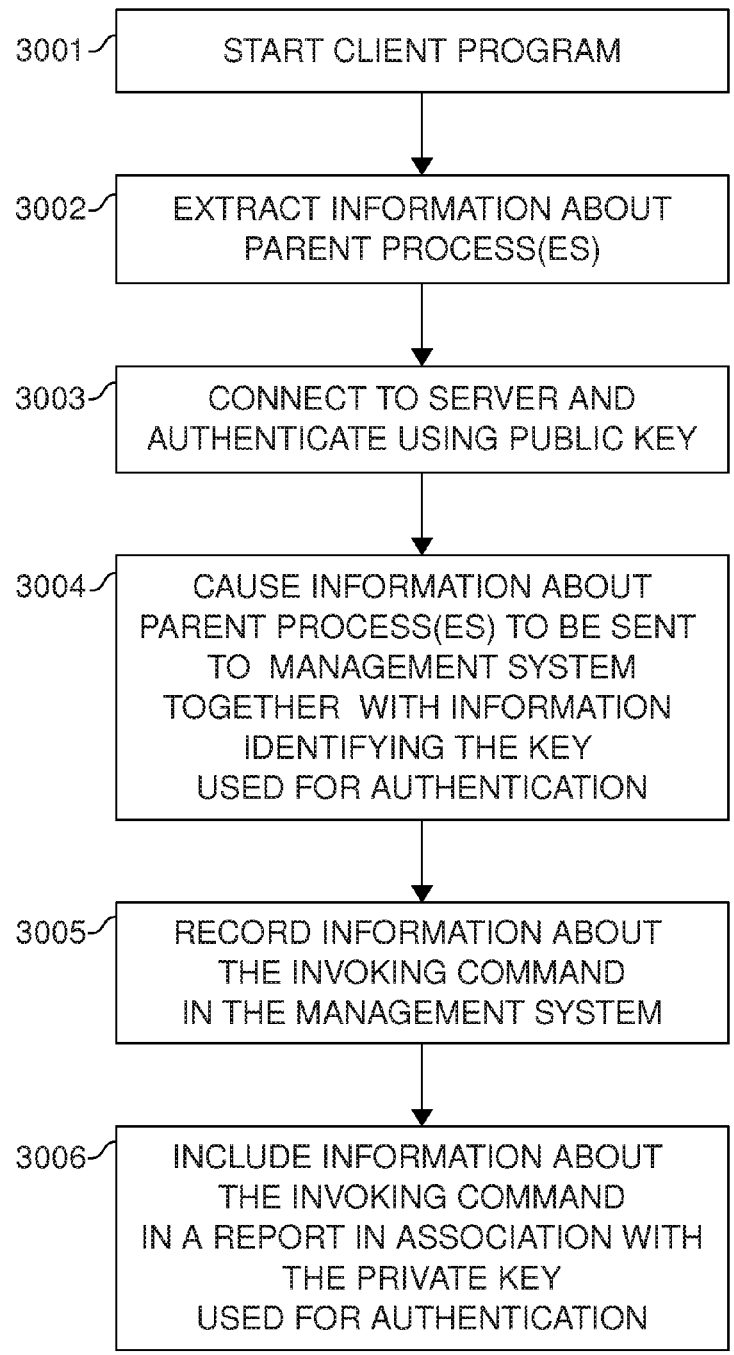
FIG. 30 illustrates extracting information about the invoking command in an SSH client for automatically annotating authorized connections with the commands that use them in an embodiment.

FIG. 30 illustrates extracting information about the invoking command in an SSH client for automatically annotating authorized connections with the commands that use them in an embodiment. A particular unexpected benefit is that when there are lots of existing undocumented public key login authorization in an organization's computing infrastructure, information about the invoking command reveals which script or application is using each authorization. This is extremely useful for analyzing and sorting the existing connections. Such information substantially reduces the cost of the deployment project when a customer starts to automatically manage user keys in their environment (potentially by millions of dollars in a large environment). At (3001), the SSH client program is started. Information about parent process(es) of the program is extracted (3002), e.g., by using the "ps" command or reading the /proc file system on Unix/Linux and the program/command name (and preferably also path and arguments for each such command is extracted; some commands may be filtered out using, e.g., configured known non-interesting command names or regular expressions).

At (3003), the SSH client connects to the SSH server and authenticates using public key (though, password-based authentication can also be used in some embodiments, possibly using passwords stored on the client). At (3004), information about the parent process(es) is caused to be sent to a management system, preferably together with information identifying the public key and/or user account on the server.

In one embodiment, the client spawns a background process that connects to the management system, authenticates, and sends the information to the management system, without slowing down the client. In another embodiment the information is sent to a local management agent, which immediately or periodically sends such information to the management system (possibly aggregating information from multiple client instances). In yet another embodiment the information is saved in a file, and a periodically running management agent sends the information to the management system when it starts the next time. In yet another embodiment the information is saved in a file, and an agentless management system fetches the file when it connects to the management system the next time.

At (3005) the management system records the information it has received from one or more clients in the management system's database; for example, it might record for each public key which clients use the public key using which commands.

At (3006), information about the invoking command(s) is included in a report in association with identifying information about the private key used for authentication, or with the user account on the server. In one embodiment this step would be performed when computing a report about the use of a public key or user account, and would be generated by performing one or more SQL queries against a relational database on the management system, extracting information about the key or user and the commands that use it (possibly using a join operation, as is well known to one skilled in formulating SQL queries for reports). Such a report might be displayed in a window in a user interface, in a HTML page, output as a spreadsheet or text file, or formatted for printing or page-based viewing (e.g., as a PDF or Postscript file). Certain aspects might be highlighted in such a report, such as a key being used for more than one command, or a key being used for a "unrecognized" or "unauthorized" command. In one embodiment further information is collected in addition to parent processes, such as whether the command was run interactively (as determined, e.g., by using the isatty( ) function on the standard input file descriptor).

Figure 31:
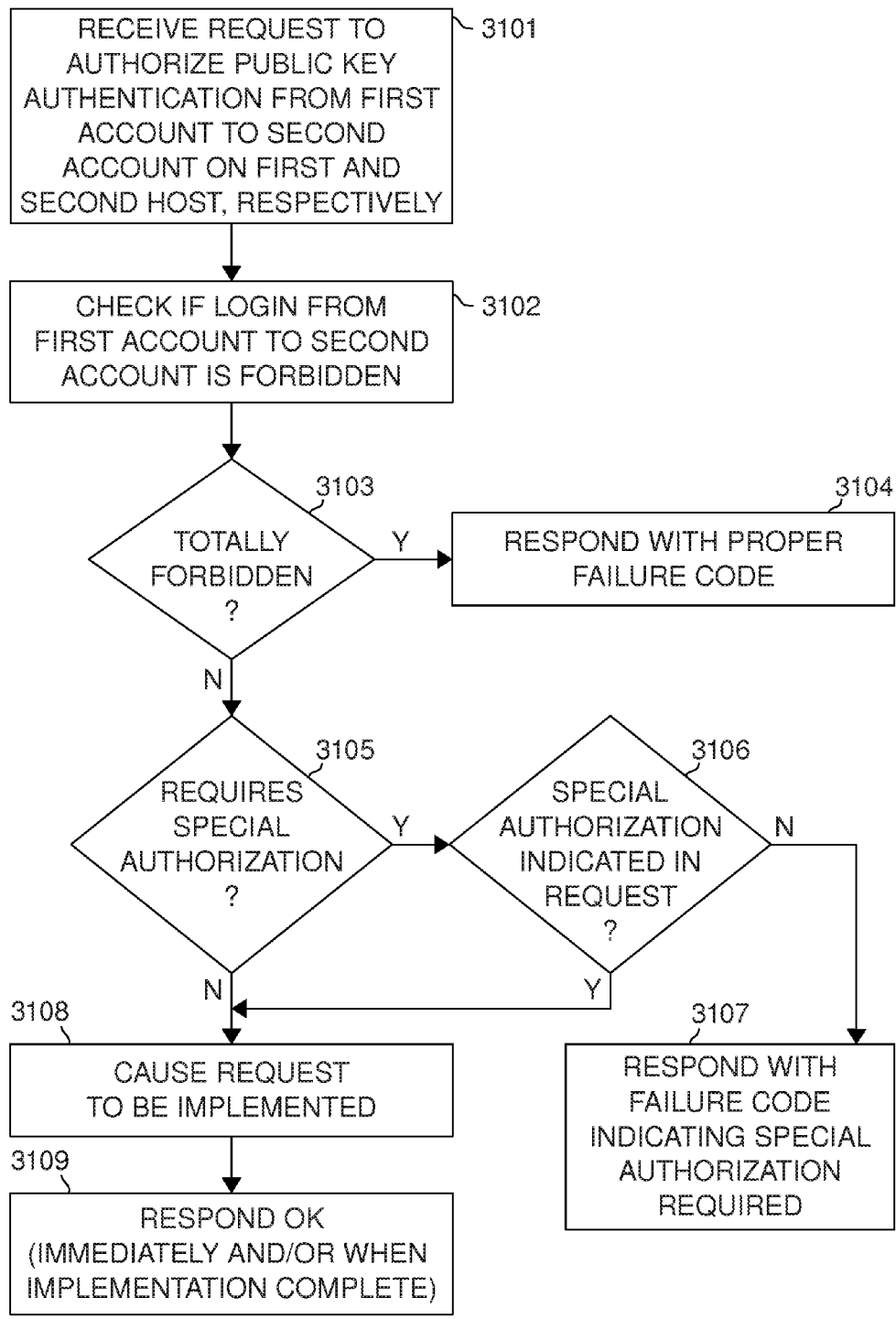
FIG. 31 illustrates checking a request to authorize a first account to log into a second account using public key authentication against rules prohibiting certain connections without special authorization in an embodiment.

FIG. 31 illustrates checking a request to authorize a first account to log into a second account using public key authentication against rules prohibiting certain connections without special authorization in an embodiment. A particular benefit of this embodiment is that it can be used to require special authorization against authorizing connections across "Chinese walls" within a bank, or from, e.g., development machines to production machines. Benefits include better protection against human errors (misconfiguration), additional layer against unscrupulous administrators trying to escalate their privileges, or developers turned criminal trying to gain access to production systems.

A request to authorize public key authentication from a first account on a first host (or a group of hosts) to a second account on a second host (or group of hosts) is received (3101). Such a request might be entered on a command line by a system administrator, using a GUI or web interface by an administrator, or received from a separate change control system. Here it is assumed that when the request comes here, the "normal" approvals for a request to connect have already been received (e.g., approval from supervisor and/or approval from security team; the required approvals may depend on the first and second hosts).

It is checked whether some rule prohibits logins from the first account on the first host to the second account on the second host (3102). The management system may allow configuration of such prohibition rules, such as a rule saying that logins from the group of hosts representing development machines to the group of hosts representing production machines are absolutely prohibited, or are only permitted after a special review.

If the requested automated login connection is totally forbidden (3103), the management system responds to the request by denying it and sending or displaying an error response with the proper failure code (3104).

If the requested automated login connection requires special authorization and is otherwise forbidden (3105), it is checked whether the authorization request indicates that the special authorization has already been provided (3106), and if not, a response is sent with a failure code that indicates that a special authorization is required (3107). In one embodiment this causes the change management system to send the request for further authorizations to the appropriate persons (which may be indicated in the response and, e.g., configured in the forbidding rule).

If the request does not require special authorization or the authorization has already been provided, the management system causes the requested automated login to be implemented (3108) (e.g., by setting up public key authentication from the first machine to the second machine). Finally the management system responds with success (3109) (to the change management system or via a user interface). Such a response might be provided immediately or when the request has actually been implemented (if the request must be implemented during maintenance windows, its implementation could take days or weeks; a user interface may provide a way of viewing pending requests, their status, and/or estimates of when they can be implemented, and provide a way to implement them immediately, overriding normal maintenance windows).

In some embodiments public key authentication to certain accounts is forbidden (for all hosts or for some group of hosts). For example, public key authentication as "root" might not be permitted, or might require special authorization.

Figure 32:
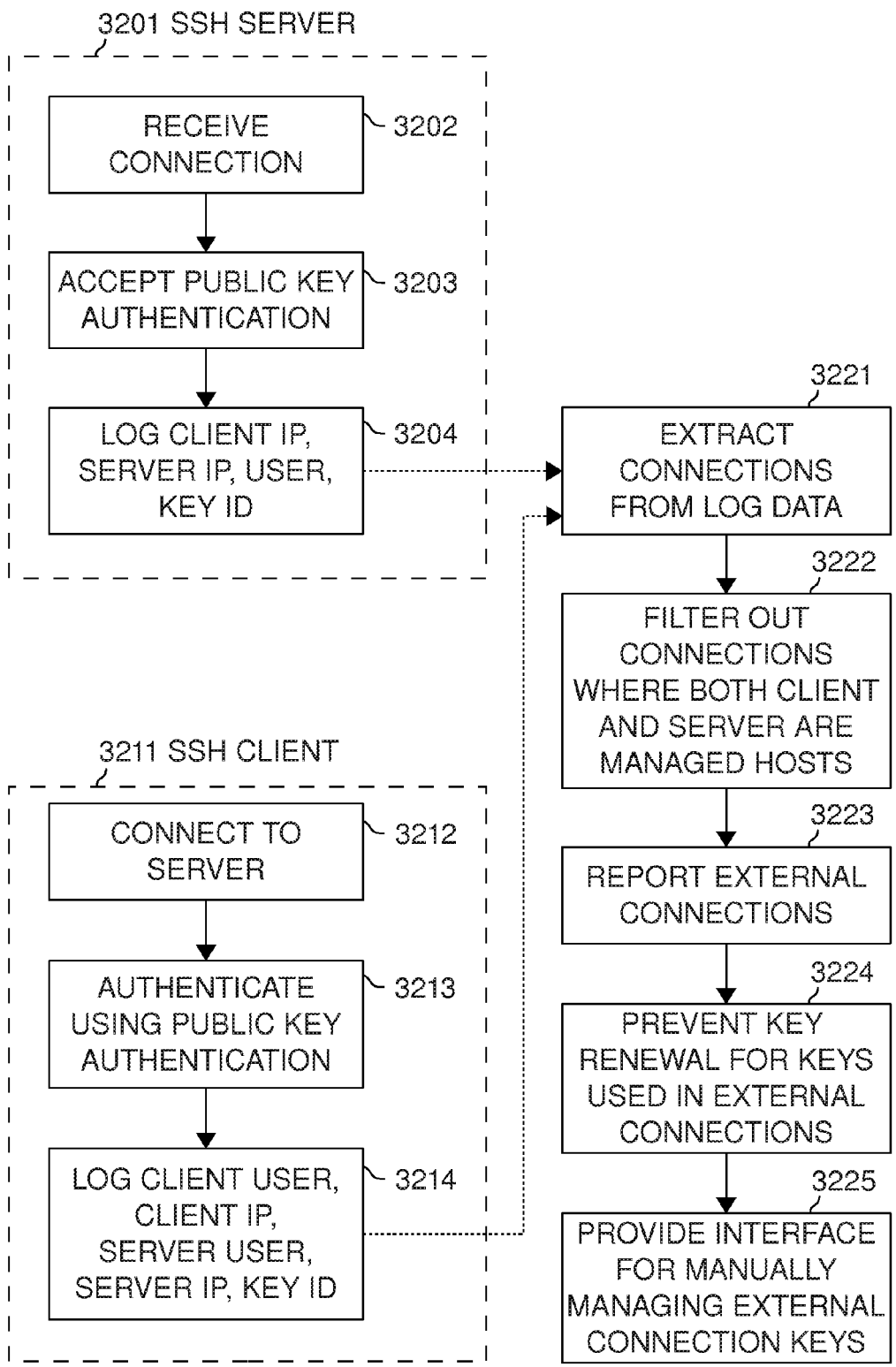
FIG. 32 illustrates detecting connections between the managed hosts and external hosts using information logged by SSH servers and clients in an embodiment.

FIG. 32 illustrates detecting connections between the managed hosts and external hosts using information logged by SSH servers and clients in an embodiment. In this embodiment, an SSH server (3201) receives a connection (3202), accepts public key authentication for the connection (3203), and logs the connecting client's IP address, the server's IP address, the user name, and the key finger print (or ther key identifier) (3204). The logging may take place as one message or multiple messages, and may be interleaved with the other steps. In one embodiment the information is logged using the syslog service on Unix/Linux. In one embodiment the server's IP address is implicit in the address/host name that logs the information. In one embodiment the logging is performed by OpenSSH 5.8 server to syslog.

An SSH client (3211) connects to a server (3212), authenticates a user to the server using public key authentication (3213), and logs the client's user name, IP address, server user name, server IP address, and key fingerprint (or other key identifier) (3214). Again, the logging may be interleaved with the other operations. In both the client and the server, the information that is logged may vary and in some embodiments some of the listed information is logged, and in others more information is logged. Advantageously, log information is collected to a central store, such as by using the syslog daemon and protocol on Unix/Linux to collect syslog information into a central repository. In one embodiment the management system causes the syslog daemon on a group of hosts to be configured to send the information to a central repository and/or to the management system. The management system may configure syslog, e.g., by reading /etc/rsyslog.conf and files in the /etc/rsyslog.d directory, adding the centralized repository as a destination for log data for the desired services (particularly ssh and sshd), and writing back the modified file(s). Such a change may be implemented either agentless by the management system or using a separate management agent on the host to perform the configuration. On windows the Windows event log configuration may be changed correspondingly, as described in Microsoft Windows documentation.

A management system is provided access to collected log data from SSH client and server, and it extracts information about public key authenticated connections from the collected log data (3221), e.g., by parsing the log data using regular expressions, as is known in the log analysis field, possibly combining multiple log records to establish a connection and using IP addresses, time and public keys (key fingerprints or other identifiers in the log data) to associate the client and server side of a connection to identify which host connected to which server using which public key, preferably further identifying the user at each end (and in some embodiments, also the script application making the connection).

The management system then determines whether each end of the connection is a managed host (by performing a lookup from its database based on the corresponding IP address or host name), and filters out connections where both client and server are managed hosts in the management system (3222). Connections where one or both hosts is unmanaged are recorded in the management system's database or other suitable storage (multiple connections between the same hosts may be combined, and different embodiments may record different information about the connections). In one embodiment connections where both hosts are unmanaged are not recorded. Connections where at least one endpoint is an unmanaged host are called external connections. In one embodiment the public keys (or their fingerprints or other suitable identifiers) involved in external connections are stored in a database.

The management system then generates a report about external connections (3223), including information about at least one external connection detected by steps (3221-3222). The report is generated by querying the management system's database of external connections. In one embodiment at least one unmanaged endpoint of such a connection is included in the report. Such a report is advantageous for identifying hosts that should be brought under management so that public keys used for such connections can be properly managed and renewed, allowing better compliance with security standards (such as current and future PCI or SOX standards) by the organization. In another embodiment at least one public key (identified by fingerprint or other suitable identifier) used in an external connections is included in a report. Such a report is useful for identifying which keys cannot be renewed (because renewing such a key could break existing external connections, possibly causing disruptions and downtime in the operation of the organization's IT system). Not all embodiments necessarily include the report generation.

The management system prevents key renewal (3224) for public keys (or more precisely, the public-private key pair) for keys that are used in external connections. Key renewal means that a new private key is caused to be generated (on/for the client host) and configured as an identity key for the user(s) on the host(s) where the key is used by client(s), communicating the corresponding public key to user(s) on host(s) where the old public key is authorized for login, and then removing the old private key (or at least disabling it as an identity key) and preferably removing the corresponding old public keys. The whole renewal operation may consist of multiple parts that may need to be performed during one or more maintenance windows. Advantageously the management system provides a facility for performing key renewals completely automatically in the background, without administrator intervention. However, the management system may also provide a means for performing key renewals immediately on request (this would be beneficial when, e.g., a key is known to be suspected as compromised, or when a user having had access to the key leaves the organization or changes to a different role in the organization). Advantageously the management system enforces key renewal at configured time interval, such as once per year, limiting key lifetimes.

Renewing a public key that is used for external connections would break the external connection, because the key could be changed on only one side of the connection. Preventing the renewal may mean not renewing the said key at all, or may mean leaving the old key still as authorized on a management server where the client is unmanaged, or leaving the old private key as an alternative identity on the client if the client is managed and the server is unmanaged.

The management system also provides an interface for manually managing external connection keys (3225). In one embodiment key renewal is possible for keys used in external connections, but key installations and changes for such hosts must be performed manually by an administrator. An interface (e.g., GUI or web interface) provided to an administrator provides a way to download a public key for a host (when server unmanaged) or upload a key (when client unmanaged). In one embodiment there is also a control for causing renewal to be manually initiated for a key used in an external connection. In the key renewal process these interfaces substitute the steps of automatically installing a public key as an authorized key on a host, and generating a private key on a host, making it an identity key, and providing the corresponding public key to the management system. In one embodiment a control is provided for cancelling or postponing renewal for a key.

In one embodiment the management system provides an interface for configuring IP address or domain name of another management system together with an authentication credential for the other management system (with means for supplying and/or obtaining such authentication credential), and associating a public key with such other management system (either by the host names/IP addresses used in external connections, possibly using subnets, or by manually specifying that an external connection is with a particular other management system). When a renewal request is made, the management system will connect to the specified other management system, authenticate using the specified credential, request the other management system to perform the part of a key renewal that involves a host managed by it (public key installation as authorized key, or private key generation and installation as identity key, and key removals), and providing a response to the first management system when complete (such operations may need to be performed during maintenance windows on the other management system, thus potentially taking many days or weeks; thus the response may in some embodiments be provided by connecting back to the first management system later). In one embodiment the management systems automatically communicate to each other the hosts that they manage, and external connections between such co-operating management systems are automatically caused to be handled co-operatively as described above.

In one embodiment the management system also provides an interface that permits an administrator to identify a key (e.g., by its fingerprint) and specify that the key is used for an external connection (optionally providing a description, IP address, or domain name that helps identify where or how it is used). Such an interface may be beneficial for identifying external connections to/from routers or other back-box network devices that cannot be brought under management and/or where external connections cannot be automatically detected.

It is clear that the elements or steps described here could be implemented in a different order, additional steps could be included, or some of the steps could be omitted.

In one embodiment the management system receives a public key from a managed host and generates from the public key a key fingerprint in at least two different formats (e.g., the format used by OpenSSH and the format used by Tectia SSH) and stores the generated fingerprints in a database. A particular benefit of this arrangement is that log data generated by various SSH implementations refers to public keys using key fingerprints, and in an environment containing multiple SSH implementations the different implementations may use different fingerprint formats for identifying keys. Storing the fingerprint in the management in each supported format permits the corresponding public key to be quickly looked up using the fingerprint. Without having the fingerprint in the proper format in the management system it would be necessary to iterate over many public keys in the management system computing fingerprints for them in the proper format, until a matching fingerprint is found (or all keys have been tried). (It is not possible to derive a key from its fingerprint.) Equivalently, unique values derived from the fingerprints can be used (e.g., cryptographic hashes of fingerprints).

Figure 33:
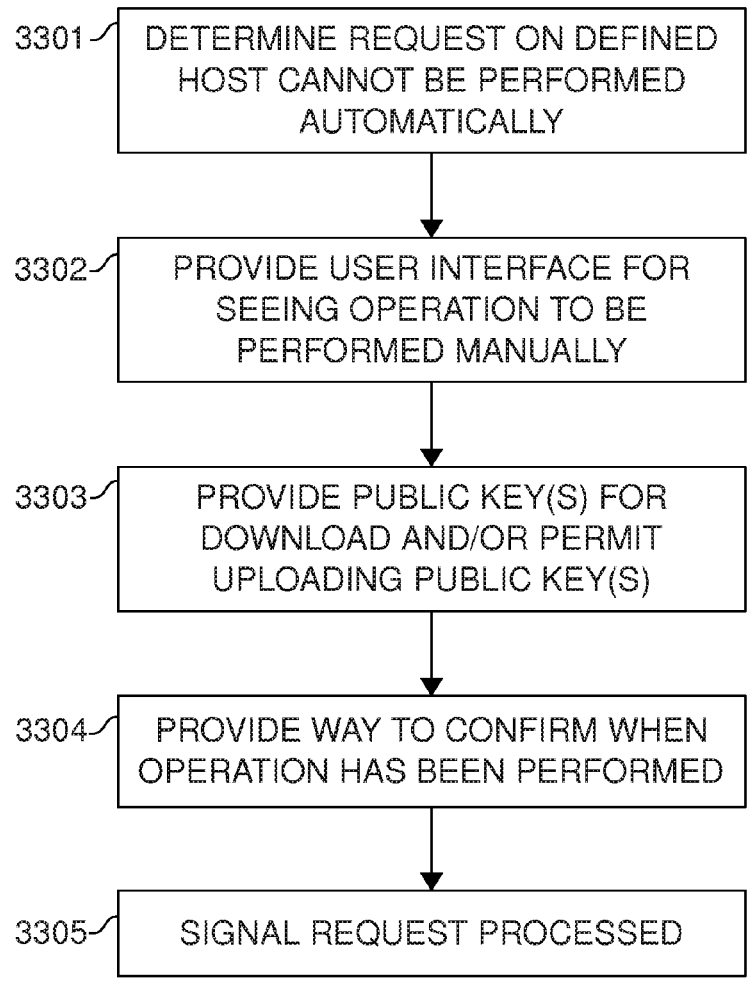
FIG. 33 illustrates performing the part of key management requests that touch external hosts manually in an embodiment.

FIG. 33 further illustrates performing the part of key management requests that touch external hosts manually in an embodiment. At (3301) it is determined that a request involving a particular host cannot be performed automatically (e.g., because the host is not managed by the management system making the determination). An interface is provided for a system administrator to see the operation(s) that need to be performed manually (3302). The interface also provides means for seeing a description of what needs to be done for the operation and provides a means for downloading (new) public key(s) to be installed (and optionally made authorized keys or identity keys) on host(s) not managed by the management system and/or for uploading (new) public keys for host(s) not managed by the management system (3303). It may also specify that certain keys need to be removed. The interface also provides a means for confirming when the manual part of the operation has been performed (3304). In response to the user confirming the operation as performed, the management system signals the request as processed (3305), which may cause a higher-level request to continue executing.

Many other embodiments of the invention are also possible. In one embodiment bringing a large SSH environment comprises the phases of deploying the management agent (or deploying authorization credentials for agentless management) on a plurality of hosts that then become managed hosts, discovering existing SSH identity keys and authorized keys for users on a plurality of the managed hosts, analyzing the identity keys and authorized keys to detect authorized connections between user accounts on the managed hosts, and then managing the connections automatically using the management system.

In one embodiment a deploying the management system scans a network (e.g., IP address range or subnet) for hosts that run SSH at given TCP/IP port(s) (normally port 22). The management system may also scan for other ports, particularly those normally used for running services that use certificates, such as HTTP/S (default TCP port 443), IMAP over SSL (default TCP port 993), or SMTP over SSL (default TCP port 465, or 25 if using the STARTTLS method in SMTP). The management system stores information about scanned hosts in its database, indicating whether the host responded to a "ping" or TCP/IP connection request, which ports were running protocols that use certificates or cryptographic keys, cryptographic key parameters, certificate parameters (e.g., expiration), and which protocol was encountered in each case, SSH version number, which hosts run an SSH server, etc. The management can be configured to repeat the scan regularly (e.g., once per week) to discover new hosts. The scan can be configured to skip hosts that are already under management.

The management system makes discovered hosts visible in its user interface (e.g., web interface). It permits automatically deploying management on them (whether using agent or otherwise) by allowing entry of username and password (and possibly another password for "sudo" or a privilege escalation system such as PowerBroker). These can be used by the management system to log into the host to be managed and obtain root access for deploying management on the host. It can also permit downloading a public key that can be manually added as an authorized key for root on hosts to be taken under management (or an automated installation system can be used to install the public key as an authorized key on a group of hosts). The management system may also install an agent program on the hosts being taken under management.

When the management system is deployed on a host, advantageously an internal identifier for the host is stored in a file in the host's file system (e.g., in /etc/ssh/sshmanager_id). Additionally, credentials permitting the management system to connect to the host and/or the host to connect to the management system are installed on the host. In one embodiment installing the credentials comprises installing a public key as an authorized key for the "root" or "Administrator" user on the host, so that the management system can use the SSH protocol and public key authentication to log into the managed host. Advantageously the host's public host key would be copied to the management system so that the management system can reliably identify the host using the host key (the StrictHostKeyChecking option can be enabled if an SSH implementation is used for connecting).

During deployment or soon thereafter, the management system obtains information about the management host using the management agent or agentless management connection, such as the agent's operating system, SSH versions, configurations, etc.

In one embodiment the management system manages a host that requires a special interface not directly supported by management agents and agentless management. For example, Cisco routers are often managed over SSH, and their public host keys should be made available to other hosts and if public key authentication is used for login, the management system should advantageously be able to configure public key authentications on such systems. The management system supports connectors, small programs that implement management of such hosts. In one embodiment connectors are programs written in, e.g., Python that are uploaded into the management system and convert an API implemented by the management system to a protocol implemented by the managed device (e.g., using command line over SSH to configure the device). In another embodiment the management system opens a connection to a helper host on which a connector is run, logging into the helper host using SSH, and runs a connector program on that host, giving instructions to the connector program by, e.g., talking a suitable protocol (e.g., the same protocol that is used with management agents) with the connector, or by supplying command line arguments to the connector program to specify what it is to do.

In one embodiment the management system automatically configures IP address restrictions for public keys in the authorized keys file (e.g., by adding a "from=" option in the file when OpenSSH 5.8 is used). The IP address restriction is made to contain those IP addresses from which the management system permits using the key. A benefit of this approach is that it makes it much harder for rogue administrators to copy private keys and use them without authorization.

In one embodiment the management system provides for configuring a "forced command" (using, e.g., the "command=" option for the authorized key in OpenSSH 5.8) on a host. The permitted command might be specifiable, e.g., for each authorized connection separately to restrict what can be done on the host. The management system optionally provides a means for defining user-readable names for permitted operations (such as "Backups only", "File transfers to directory" (with a directory argument), or "Run application" (with a path to binary argument). When a forced command is specified in a configured connection or rule, or in a request to set up an authorized connection using public key authentication, the management system ensures that the forced command is included in all entries in authorized keys files added for that connection, using the proper syntax for the SSH server on each host to include the forced command.

In one embodiment the management system includes options in the authrorized keys files for all connections to/from functional accounts to prevent authentication agent forwarding (OpenSSH no-agent-forwarding option), port forwarding (OpenSSH no-port-forwarding option), allocation of pseudo-tty (OpenSSH no-pty option), execution of "rc" files (OpenSSH no-user-rc option), X11 forwarding (OpenSSH no-X11-forwarding option).

In one embodiment the management system is configured with a set of certificate authorities (CA certificates) that are accepted for authentication throughout the environment or on a group of hosts. The management system adds an OpenSSH "cert-authority=" option (or its equivalent for other implementations) in one or more authorized keys files, and adds one or more pricincipal names from the user's certificate in an OpenSSH "pricincipals=" option (or equivalent) to list users that are permitted to authenticate using a certificate issued that certificate authority to the given target account. Such a management system could be used for managing connections in environments where certificates instead of public keys are used for authenticating connections that don't require a password. Managing connections may include, e.g., creating new passwordless login connections (and installing related identity keys and authorized keys as needed), removing existing passwordless login connections (and removing related authorized keys and identity keys as needed), and renewing existing identity keys and corresponding public keys used as authorized keys.

In one embodiment host-based authentication (preferably with public key based host authentication) according to the SSH protocol is used for authenticating passwordless logins. The management system modifies a $HOME/.ssh/.shosts file to permit or deny passwordless logins from other accounts. The management system also ensures that the SSH server has access to the current host keys for all clients that connect to accounts on that host using host based authentication.

In one embodiment the management system reduces operational costs in an enterprise by automating the set-up of passwordless logins (using, e.g., public key authentication for such logins). The management system receives a request to set up public key authentication from a workflow, change control, or other system, creates (or causes creation of) private keys as needed, configures the key as an identity key, copies the appropriate public key to one or more servers and configures it as an authorized key for one or more user accounts to which login using it should be permitted according to the request, and when done, notifies the requesting system that the operation is complete.

The management system optionally also reduces operational costs due to removing passwordless login connections (e.g., public key authenticated connections). The management system receives a request to remove public key authentication from a workflow, change control, or other system, determines from which hosts and users the authorized public key used for the connection should be removed (it can be conservative in this determination, trying to remove it from more hosts than absolutely necessary), and causes the key to be removed from the determined users on the determined hosts.

In one embodiment one user account has more than one private key that is used for public key authentication, such as a separate key for every authorized passwordless login connection that the user is authorized to make.

In another embodiment the same private key (identity key) is shared used for more than one authorized passwordless login connection. The authorized public keys on servers may result from more than one requested connection or policy rule that establishes connections. An unexpected benefit of this approach is that only it works reliably with OpenSSH servers, as OpenSSH servers count queries about whether a certain private key is authorized to login as login attempts, therefore working unreliably if a user has several private keys as identity keys. A tricky problem with this approach, however, is that when removing an authorized connection, one cannot remove all authorized public keys corresponding to the private key used for the connection, because the key might also be used for another connection. Therefore, the management system determines on which user accounts on which hosts the public key was configured as an authorized key using information in its database, and only removes the key from those user accounts on those hosts that were (exactly) determined. Furthermore, it is possible that more than one rule, or more than one prior connection authorization request, causes a public key to be authorized for logging into an account on a host. The management system determines whether any other rule or prior request is authorizing the public key before removing it from an authorized keys file.

In one embodiment an SSH client connects to an SSH server on a managed host. The SSH client determines that the server is managed by a management server that is authorized to manage also the client, and requests client configuration information from the SSH server (without necessarily having a direct connection to the management system, or even being able to directly connect the management system as the client may be, e.g., outside the enterprise firewall). The authorization to manage the client may be determined by having a management system public key (or certificate) stored in the client, and having information indicating that the SSH server is managed by the server be digitally signed by that public key (or a public key in the certificate). The client then receives configuration information from the management system indirectly through the SSH server. The configuration information exchange may take place, e.g., before already before the client has authenticated itself to the SSH server (the configuration information might be obtained, e.g., by requesting a special "service" (according to the SSH Transport Layer Protocol) instead of the normal user authentication service. After receiving the configuration information, including the server's proper host key (digitally signed by the management system), the client can validate the server's host key even if it did not previously know the server's key. This permits even the first connection from an SSH client to an SSH server to properly authenticate the server and prevent unwanted man-in-the-middle attacks.

In one embodiment an SSH client receives a host key that it does not recognize (or associate with the server host) from an SSH server. The client connects to the management system (directly or through the SSH server) and requests the management system to confirm that the host key is a valid host key for the host. If the management system confirms that it is a valid host key for the contacted host, the client accepts the server as valid and continues establishing the SSH protocol session (or saves the key as valid host key for the server host and restarts the connection). The host key is optionally saved in the client's records (either permanently or cached for a time) as a valid host key for the requested host.

What is claimed is:
1. An apparatus, comprising:
at least one processor; and
at least one memory including instructions which when executed by the at least one processor, cause the apparatus to manage security related keys, the security related keys being utilized between a first managed host having a client and a second managed host having a server,
wherein, in order to manage the security related keys, the at least one memory includes further instructions which, when executed by the at least one processor, further cause the apparatus to:
install a security related key as an authorized security related key for the second managed host for securing communications with the first managed host, and
wherein, in order to cause a security related key to be installed, the at least one memory includes further instructions which, when executed by the at least one processor, further cause the apparatus to:
insert a request to install the security related key as an authorized security related key in a pending request data set;

determine if a window where the request is allowed to be processed is open; and after determining that the window where the request is allowed to be processed is open, process the request, the processing comprising sending a request to install the security related key for the second managed host, wherein the at least one memory includes further instructions which, when executed by the at least one processor, cause the apparatus to create a new passwordless login connection, wherein, in order to create the new passwordless login connection, the at least one memory includes further instructions which, when executed by the at least one processor, further cause the apparatus to:

add an identification of a certificate authority that is accepted for authentication in a configuration file used by a secure shell (SSH) implementation; and add a principal name used in a certificate in the configuration file used by the SSH implementation to identify a user that is permitted to authenticate to an account using the certificate issued by the certificate authority.

2. The apparatus of claim 1, wherein, in order to manage the security related keys, the at least one memory includes further instructions which, when executed by the at least one processor, further cause the apparatus to create a private key to be for a first account, the security related key being a public key corresponding to the private key.

3. The apparatus of claim 1, wherein the security related keys comprise SSH related keys, the client comprises a SSH client, the server comprises a SSH server and the request is sent to the host using the SSH protocol to connect to the host.

4. The apparatus of claim 3, wherein, in order to manage the security related keys, the at least one memory includes further instructions which, when executed by the at least one processor, further cause the apparatus to discover information about user information sources for a plurality of computers.

5. The apparatus of claim 1, wherein the installation of the security related key is performed in response to receiving a request to authorize a first account to log into a second account.

6. The apparatus of claim 1, wherein, in order to manage the security related keys, the at least one memory includes further instructions which, when executed by the at least one processor, further cause the apparatus to revoke authorization of a first account to access a second account.

7. The apparatus of claim 1, wherein, in order to manage the security related keys, the at least one memory includes further instructions which, when executed by the at least one processor, further cause the apparatus to renew a security related key pair used for public key authentication, wherein, in order to renew a security related key pair, the at least one memory includes further instructions which, when executed by the at least one processor, further cause the apparatus to:

create a new private key and adding it as an identity key on a host;

copy a public key corresponding to the private key to the same places where a public key corresponding to the security related key pair being renewed is stored; and remove at least one public key corresponding to the security related key pair being renewed, wherein at least one of the security related keys is stored in a non-standard location.

8. The apparatus of claim 1, wherein, in order to manage the security related keys, the at least one memory includes further instructions which, when executed by the at least one processor, further cause the apparatus to configure an internet protocol (IP) address restriction for a public key in an authorized security related keys file, the IP address restriction containing those IP addresses from which the apparatus permits using the public key.

9. The apparatus of claim 1, wherein the at least one memory includes further instructions which, when executed by the at least one processor, further cause the apparatus to:

receive a request to set up an authorized connection, the request comprising a restriction on what is allowed to be done using that connection; and include the restriction in all entries in authorized security related keys files added for that connection.

10. The apparatus of claim 1, wherein the at least one memory includes further instructions which, when executed by the at least one processor, cause the apparatus to:

bring a provisioned virtual machine under management, comprising:

receive authentication from the virtual machine; and send keys to the virtual machine based on its host group, the security related keys including at least one key selected from the group consisting of:

a host key for another machine;

a public user key that authorizes logging into the virtual machine from at least one account on at least one other machine using public key authentication; and a private key that authorizes the virtual machine to log into at least one other machine.

11. A method of managing security related keys, the security related keys being utilized between a first managed host having a client and a second managed host having a server, the method comprising:

installing a security related key as an authorized security related key for the second managed host for securing communications with the first managed host, the installation including:

inserting a request to install the security related key as an authorized security related key in a pending request data set;

determining if a window where the request is allowed to be processed-is open; and after determining that the window where the request is allowed to be processed is open, processing the request, the processing comprising sending a request to install the security related key for the second managed host;

creating a new passwordless login connection, the creating including:

adding an identification of a certificate authority that is accepted for authentication in a configuration file used by a secure shell (SSH) implementation; and adding a principal name used in a certificate in the configuration file used by the SSH implementation to identify a user that is permitted to authenticate to an account using the certificate issued by the certificate authority.

12. The method of claim 11, wherein the method further comprises causing a private key to be created for a first account, wherein the security related key is a public key corresponding to the private key.

13. The method of claim 11, wherein the installation is performed in response to receiving a request to authorize a first account to log into a second account.

14. The method of claim 11, wherein the method further comprises revoking authorization of a first account to access a second account.

15. The method of claim 11, wherein the method further comprises renewing a security related key pair used for public key authentication, renewing the security related key pair including:
- creating a new private key and adding it as an identity key on a host;
- copying a public key corresponding to the private key to the same places where a public key corresponding to the security related key pair being renewed is stored; and
- removing at least one public key corresponding to the security related key pair being renewed, wherein at least one of the security related keys is stored in a non-standard location.

16. The method of claim 11, wherein the method further comprises configuring an internet protocol (IP) address restriction for a public key in an authorized security related keys file, the IP address restriction containing those IP addresses from which a management system permits using the public key.

17. The method of claim 11, further comprising:
- receiving a request to set up an authorized connection, the request comprising a restriction on what is allowed to be done using that connection; and
- including the restriction in all entries in authorized security related keys files added for that connection.

18. The method of claim 11, further comprising bringing a provisioned virtual machine under management,
- wherein bringing provisioned virtual machine under management includes: receiving authentication from the virtual machine; and
- sending keys to the virtual machine based on its host group, the security related keys including at least one key selected from the group consisting of:
  - a host key for another machine;
  - a public user key that authorizes logging into the virtual machine from at least one account on at least one other machine using public key authentication; and
  - a private key that authorizes the virtual machine to log into at least one other machine.

19. A non-transitory computer readable medium comprising program code for causing a computer to perform:
- managing security related keys, said the security related keys utilized between a first managed host having a client and a second managed host having a server, wherein the managing comprises:
- installing a security related key as an authorized security related key for the second managed host for securing communications with the first managed host, the installing including:
- inserting a request to install the security related key as an authorized security related key in a pending request data set; and
- determining if a window where the request is allowed to be processed is open; and
- after determining that the window where the request is allowed to be processed is open, processing the request, the processing comprising sending a request to install the public key for the second managed host,
- wherein the computer program code further causes the computer to perform instructions for creating the new passwordless login connection, the creating comprising: adding an identification of a certificate authority that is accepted for authentication in a configuration file used by a secure shell (SSH) implementation; and
- adding a principal name used in a certificate in the configuration file used by the SSH implementation to identify a user that is permitted to authenticate to an account using the certificate issued by the certificate authority.

20. The non-transitory computer readable medium of claim 19, wherein the managing further comprises causing a private key to be created for a first account, wherein the security related key is a public key corresponding to the private key.

21. The non-transitory computer readable medium of claim 19, wherein the program code causes the computer to perform instructions for sending the request using the SSH protocol to connect to the host.

22. The non-transitory computer readable medium of claim 21, wherein the managing further comprises discovering information about user information sources for a plurality of computers.

23. The non-transitory computer readable medium of claim 19, wherein the program code causes the computer to perform instructions for the causing installing in response to receiving a request to authorize a first account to log into a second account.

24. The non-transitory computer readable medium of claim 19, wherein the managing further comprises revoking authorization of a first account to access a second account.

25. The non-transitory computer readable medium of claim 19, wherein the managing further comprises renewing a security related key pair used for public key authentication, the renewing comprising:
- creating a new private key and adding it as an identity key on a host;
- copying a public key corresponding to the private key to the same places where a public key corresponding to the security related key pair being renewed is stored; and
- removing at least one public key corresponding to the security related key pair being renewed, wherein at least one of the security related keys is stored in a non-standard location.

26. The non-transitory computer readable medium of claim 19, wherein the managing further comprises configuring an internet protocol (IP) address restriction for a public key in an authorized security related keys file, the IP address restriction containing those IP addresses from which a management system permits using the public key.

27. The non-transitory computer readable medium of claim 19, wherein the program code further causes the computer to perform instructions for:
- receiving a request to set up an authorized connection, the request comprising a restriction on what is allowed to be done using that connection; and
- including the restriction in all entries in authorized security related keys files added for that connection.

28. The non-transitory computer readable medium of claim 19, wherein the program code further causes the computer to perform instructions for bringing a provisioned virtual machine under management, comprising:
- receiving authentication from the virtual machine; and
- sending keys to the virtual machine based on its host group, the security related keys including at least one key selected from the group consisting of:
  - a host key for another machine;
  - a public user key that authorizes logging into the virtual machine from at least one account on at least one other machine using public key authentication; and
  - a private key that authorizes the virtual machine to log into at least one other machine.

* * * * *